United States Patent
Sole Rojals et al.

(10) Patent No.: US 9,491,463 B2
(45) Date of Patent: Nov. 8, 2016

(54) GROUP FLAG IN TRANSFORM COEFFICIENT CODING FOR VIDEO CODING

(71) Applicant: QUALCOMM Incorporated, San Diego, CA (US)

(72) Inventors: Joel Sole Rojals, La Jolla, CA (US); Rajan Laxman Joshi, San Diego, CA (US); Wei-Jung Chien, San Diego, CA (US); Jianle Chen, San Diego, CA (US); Vadim Seregin, San Diego, CA (US); Marta Karczewicz, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 679 days.

(21) Appl. No.: 13/861,319

(22) Filed: Apr. 11, 2013

(65) Prior Publication Data

US 2013/0272414 A1    Oct. 17, 2013

Related U.S. Application Data

(60) Provisional application No. 61/624,277, filed on Apr. 14, 2012.

(51) Int. Cl.
| H04N 7/50 | (2006.01) |
| H04N 19/615 | (2014.01) |
| H04N 19/70 | (2014.01) |
| H04N 19/13 | (2014.01) |
| H04N 19/14 | (2014.01) |
| H04N 19/18 | (2014.01) |

(52) U.S. Cl.
CPC ........ *H04N 19/00787* (2013.01); *H04N 19/13* (2014.11); *H04N 19/14* (2014.11); *H04N 19/18* (2014.11); *H04N 19/70* (2014.11)

(58) Field of Classification Search
None
See application file for complete search history.

(56) References Cited

U.S. PATENT DOCUMENTS

| 7,379,608 B2 | 5/2008 | Marpe et al. |
| 8,446,301 B2 * | 5/2013 | He ..................... H03M 7/40 341/107 |

(Continued)

FOREIGN PATENT DOCUMENTS

WO    2011128303 A2    10/2011

OTHER PUBLICATIONS

Chen et al., "Non-CE1: throughput improvement on CABAC coefficients level coding," JCT-VC Meeting; MPEG Meeting, San Jose; (Joint Collaborative Team on Video Coding of ISO/IEC JTC1/SC29/WG11 and ITU-T SG.16 ); URL: http://wftp3jtujnt/av-arch/jctvc-siter Document No. JCTVC-H0554, Feb. 1-10, 2012, 6 pp.*

(Continued)

*Primary Examiner* — Christopher S Kelley
*Assistant Examiner* — Kaitlin A Retallick
(74) *Attorney, Agent, or Firm* — Shumaker & Sieffert, P.A.

(57) ABSTRACT

A method of decoding data indicative of a subset of transform coefficients is described. The coefficients are indicative of a block of video data. The method may include determining that no transform coefficient in the subset of transform coefficients has an absolute value greater than one, and, based on the determining, skipping one or more decoding passes on the subset of transform coefficients, the decoding passes relating to decoding level information associated with the subset of transform coefficients.

41 Claims, 9 Drawing Sheets

(56) References Cited

U.S. PATENT DOCUMENTS

| | | | |
|---|---|---|---|
| 2009/0147843 A1* | 6/2009 | Han | H04N 19/176 375/240.03 |
| 2009/0232204 A1* | 9/2009 | Lee | H04N 19/176 375/240.02 |
| 2012/0230417 A1 | 9/2012 | Sole et al. | |
| 2013/0003834 A1 | 1/2013 | Rojals et al. | |
| 2013/0028329 A1* | 1/2013 | Lou | H04N 19/176 375/240.18 |

OTHER PUBLICATIONS

Chuang et al., "Non-CE11: Block-based significance map context selection," JCT-VC Meeting; MPEG Meeting; San Jose; (Joint Collaborative Team on Video Coding of ISO/IEC JTC1/SC29/WG11 and ITU-T SG.16); URL: http://wftp3.itu.int/av-arch/jctvc-site/No. JCTVC-H0285, Feb. 1-10, 2012, 5 pp.*

Alshin et al., "Multi-parameter probability up-date for CABAC," Joint Collaborative Team on Video Coding (JCT-VC) of ITU-T SG16 WP3 and ISO/IEC JTC1/SC29/WG11 6th Meeting: Torino, IT, Document No. JCTVC-F254, Jul. 14-22, 2011, 5 pp.

Amonou et al., "Description of video coding technology proposal by France Telecom, NTT, NTT DoCoMo, Panasonic and Technicolor," ITU-T SG16 WP3 and ISOIIEC JTCIISC29NVG11, Document JCTVC-A114, Dresden, DE, Apr. 15-23, 2010, 42 pp.

Bross et al., "High Efficiency Video Coding (HEVC) text specification Working Draft 5," MPEG Meeting; Nov. 28, 2011-Feb. 12, 2011; Geneva; (Motion Picture Expert Group or ISO/IEC JTC1/SC29/WG11) Document No. N12346, Mar. 2, 2012, 75 pp.

Bross et al., "High efficiency video coding (HEVC) text specification draft 10 (for FDIS & Last Call)," 12th Meeting: Geneva, CH, Jan. 14-23, 2013, JCTVC-L1003_v34, 310 pp.

Bross et al., "High efficiency video coding (HEVC) text specification draft 6," 8th Meeting: San Jose, CA, USA, Feb. 1-10, 2012, JCTVC-H1003, 259 pp.

Bross et al., "High efficiency video coding (HEVC) text specification draft 7," 9th Meeting: Geneva, CH, Apr. 27-May 7, 2012, JCTVC-I1003_d2, 290 pp.

Bross et al., "High efficiency video coding (HEVC) text specification draft 8," 10th Meeting: Stockholm, SE, Jul. 11-20, 2012, JCTVC-J1003_d7, 261 pp.

Bross et al., "High efficiency video coding (HEVC) text specification draft 9," 11th Meeting: Shanghai, CN, Oct. 10-19, 2012, JCTVC-K1003_v7, 290 pp.

Bross et al., "WD4: Working Draft 4 of High-Efficiency Video Coding," 6th Meeting: JCTVC-F803_d2, Torino, IT, Jul. 14-22, 2011, 226 pp.

Bross et al., "WD5: Working Draft 5 of High-Efficiency Video Coding," 7th Meeting: Geneva, Switzerland, Nov. 21-30, 2011, JCTVC-G1103_d2, 214 pp.

Chen et al., "Non-CE1: throughput improvement on CABAC coefficients level coding," JCT-VC Meeting; MPEG Meeting, San Jose; (Joint Collaborative Team on Video Coding of ISO/IEC JTC1/SC29/WG11 and ITU-T SG.16 ); URL: http://wftp3.itu.int/av-arch/jctvc-site/ Document No. JCTVC-H0554, Feb. 1-10, 2012, 6 pp.

Chuang et al., "Non-CE11: Block-based significance map context selection," JCT-VC Meeting; MPEG Meeting; San Jose; (Joint Collaborative Team on Video Coding of ISO/IEC JTC1/SC29/WG11 and ITU-T SG.16); URL: http://wftp3.itu.int/av-arch/jctvc-site/ No. JCTVC-H0285, Feb. 1-10, 2012, 5 pp.

International Search Report and Written Opinion—PCT/US2013/036485—ISA/EPO—Jul. 17, 2013, 11 pp.

ITU-T H.264, Series H: Audiovisual and Multimedia Systems, Infrastructure of audiovisual services—Coding of moving video, Advanced video coding for generic audiovisual services, The International Telecommunication Union. Jun. 2011, 674 pp.

Marpe et al., "Context-based adaptive binary arithmetic coding in the H.264/AVC video compression standard," IEEE Transactions on Circuits and Systems for Video Technology, vol. 13, No. 7, Jul. 2003, 17 pp.

Wiegand et al., "WD2: Working Draft 2 of High-Efficiency Video Coding," JCTVC-D503, 4th Meeting: Daegu, KR, Jan. 20-28, 2011, 153 pp.

Wiegand et al., "WD3: Working Draft 3 of High-Efficiency Video Coding," Document JCTVC-E603, 5th Meeting: Geneva, CH, Mar. 16-23, 2011, 193 pp.

Wiegand et al., "WD1: Working Draft 1 of High-Efficiency Video Coding", JCTVC-C403, 3rd Meeting: Guangzhou, CN, Oct. 7-15, 2010, 137 pp.

International Preliminary Report on Patentability from international application No. PCT/US2013/036485, mailed Jul. 23, 2014, 7 pp.

Second Written Opinion of international application No. PCT/US2013/036485, mailed Mar. 17, 2014, 7 pp.

* cited by examiner

GROUP FLAG IN TRANSFORM COEFFICIENT CODING FOR VIDEO CODING

This application claims the benefit of U.S. Provisional Application No. 61/624,277, filed Apr. 14, 2012, the entire content of which is hereby incorporated by reference in its entirety.

TECHNICAL FIELD

This disclosure relates to video coding, and more particularly to techniques for coding transform coefficients.

BACKGROUND

Digital video capabilities can be incorporated into a wide range of devices, including digital televisions, digital direct broadcast systems, wireless broadcast systems, personal digital assistants (PDAs), laptop or desktop computers, digital cameras, digital recording devices, digital media players, video gaming devices, video game consoles, cellular or satellite radio telephones, video teleconferencing devices, and the like. Digital video devices implement video compression techniques, such as those described in the standards defined by MPEG-2, MPEG-4, ITU-T H.263, ITU-T H.264/MPEG-4, Part 10, Advanced Video Coding (AVC), the High Efficiency Video Coding (HEVC) standard presently under development, and extensions of such standards, to transmit, receive and store digital video information more efficiently.

Video compression techniques include spatial prediction and/or temporal prediction to reduce or remove redundancy inherent in video sequences. For block-based video coding, a video frame or slice may be partitioned into blocks. A video frame alternatively may be referred to as a picture. Each block can be further partitioned. Blocks in an intra-coded (I) frame or slice are encoded using spatial prediction with respect to reference samples in neighboring blocks in the same frame or slice. Blocks in an inter-coded (P or B) frame or slice may use spatial prediction with respect to reference samples in neighboring blocks in the same frame or slice or temporal prediction with respect to reference samples in other reference frames. Spatial or temporal prediction results in a predictive block for a block to be coded. Residual data represents pixel differences between the original block to be coded, i.e., the coded block, and the predictive block.

An inter-coded block is encoded according to a motion vector that points to a block of reference samples forming the predictive block, and the residual data indicating the difference between the coded block and the predictive block. An intra-coded block is encoded according to an intra-coding mode and the residual data. For further compression, the residual data may be transformed from the pixel domain to a transform domain, resulting in residual transform coefficients, which then may be quantized. The quantized transform coefficients, initially arranged in a two-dimensional array, may be scanned in a particular order to produce a one-dimensional vector of transform coefficients for entropy coding.

SUMMARY

In general, this disclosure describes techniques for coding video data. In particular, this disclosure describes techniques for coding information relating to transform coefficients in a video coding process.

This disclosure proposes techniques for encoding and decoding transform coefficients in a video coding process. In particular, this disclosure proposes techniques that will allow for one or more encoding and/or decoding passes during entropy coding of transform coefficients to be skipped. Skipping coding passes may be accomplished through the use of group flags that indicate whether a subset of transform coefficients includes any coefficients with an absolute value greater than some value (e.g., 1 and/or 2). In this way, coding syntax elements for those specific values (e.g., a syntax element that indicates whether or not a coefficient has an absolute value greater than one) may be skipped if the group flag indicates that there are no such values in the subset.

In one example, this disclosure describes a method of decoding data indicative of a subset of transform coefficients, the coefficients being indicative a block of video data, the method comprising determining that no transform coefficient in the subset of transform coefficients has an absolute value greater than one, and, based on the determining, skipping one or more decoding passes on the subset of transform coefficients, the decoding passes relating to decoding level information associated with the subset of transform coefficients.

In another example, this disclosure further describes a method of encoding data indicative of a subset of transform coefficients, the coefficients being indicative a block of video data, the method comprising determining that no transform coefficient in the subset of transform coefficients has an absolute value greater than one, and, based on the determining, skipping one or more encoding passes on the subset of transform coefficients, the encoding passes relating to encoding level information associated with the subset of transform coefficients.

This disclosure also describes a video encoder, a video decoder, apparatuses, and computer-readable mediums storing instructions that may be configured to perform the techniques for signaling transform coefficients described herein.

The details of one or more examples are set forth in the accompanying drawings and the description below. Other features, objects, and advantages will be apparent from the description and drawings, and from the claims.

DETAILED DESCRIPTION

In general, this disclosure describes techniques for coding video data. In particular, this disclosure describes techniques for coding transform coefficients in a video encoding and/or decoding process.

Entropy coding transform coefficients is typically performed over a subset of coefficients in a block of video data (e.g., a transform block). Entropy coding transform coefficients may involve coding bins that indicate a specific level (i.e., absolute value) of the transform coefficients. Example bins may include a significance bin indicating whether a particular coefficient is greater than zero, a greater-than-one bin indicating whether the particular coefficient is greater than one, and so on. Previous video coding proposals have used specific coding techniques (e.g., a significant_coeff_group_flag) to indicate whether any coefficients in a specific subset of coefficients have a non-zero absolute value. If not, coding of bins that indicate specific level information need not be performed.

This disclosure proposes to extend the concept of the significant_coeff_group_flag to other flags that may be used to skip potentially unnecessary coding of additional level information (e.g., a bin indicating a coefficient is greater than one, a bin indicating a coefficient is greater than two, etc.) in a subset of transform coefficients. In this way, unnecessary coding passes may be limited, and encoder/decoder efficiency may be improved.

Figure 1:
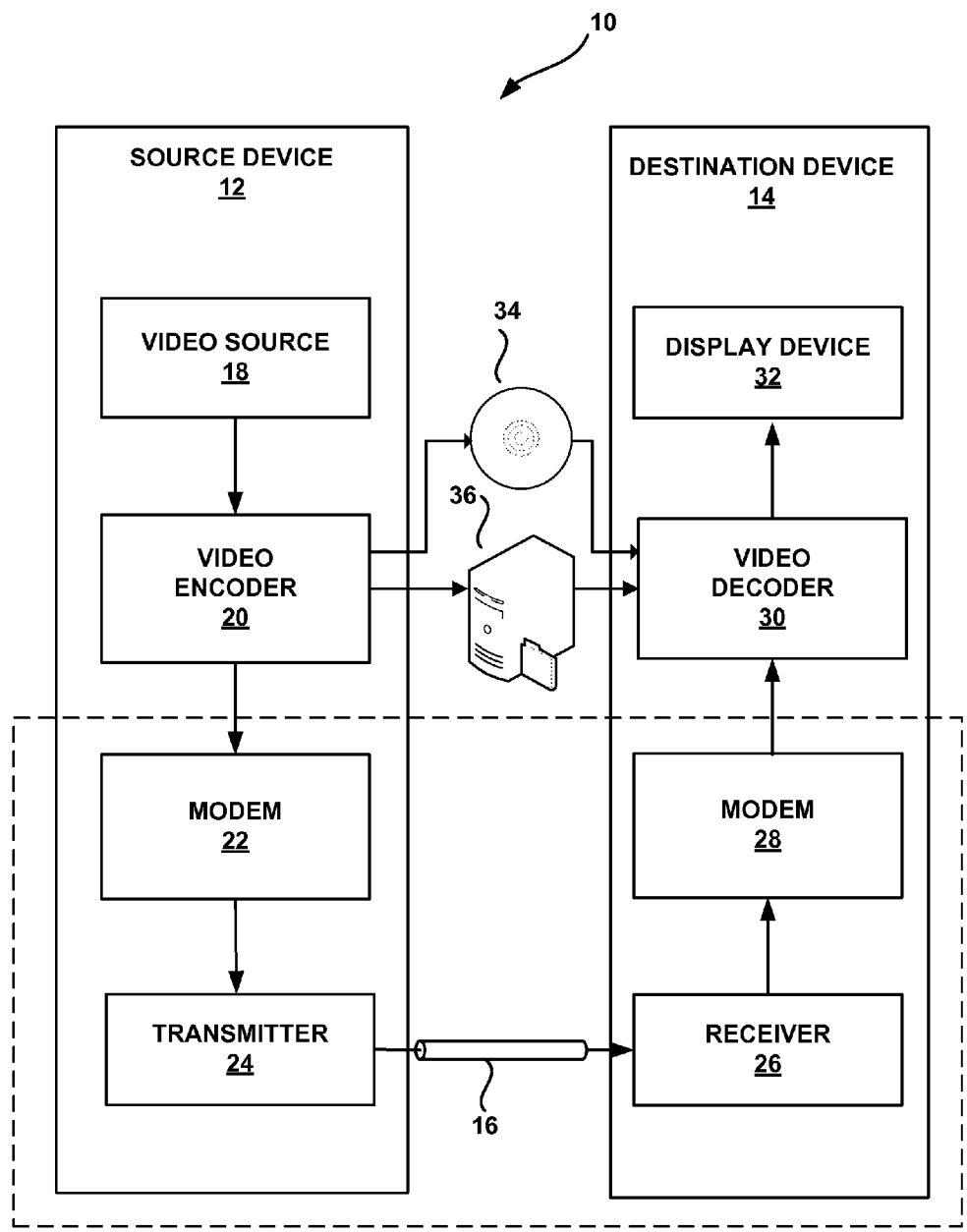
FIG. 1 is a block diagram illustrating an example video encoding and decoding system.

FIG. 1 is a block diagram illustrating an example video encoding and decoding system 10 that may be configured to utilize techniques for coding transform coefficients in accordance with examples of this disclosure. As shown in FIG. 1, system 10 includes source device 12 that transmits encoded video to destination device 14 via communication channel 16. Encoded video data may also be stored on storage medium 34 or file server 36 and may be accessed by destination device 14 as desired. When stored to a storage medium or file server, video encoder 20 may provide coded video data to another device, such as a network interface, a compact disc (CD), Blu-ray or digital video disc (DVD) burner or stamping facility device, or other devices, for storing the coded video data to the storage medium. Likewise, a device separate from video decoder 30, such as a network interface, CD or DVD reader, or the like, may retrieve coded video data from a storage medium and provided the retrieved data to video decoder 30.

Source device 12 and destination device 14 may comprise any of a wide variety of devices, including desktop computers, notebook (i.e., laptop) computers, tablet computers, set-top boxes, telephone handsets such as so-called smartphones, televisions, cameras, display devices, digital media players, video gaming consoles, or the like. In many cases, such devices may be equipped for wireless communication. Hence, communication channel 16 may comprise a wireless channel, a wired channel, or a combination of wireless and wired channels suitable for transmission of encoded video data. Similarly, file server 36 may be accessed by destination device 14 through any standard data connection, including an Internet connection. This may include a wireless channel (e.g., a Wi-Fi connection), a wired connection (e.g., DSL, cable modem, etc.), or a combination of both that is suitable for accessing encoded video data stored on a file server.

Techniques for coding transform coefficients, in accordance with examples of this disclosure, may be applied to video coding in support of any of a variety of multimedia applications, such as over-the-air television broadcasts, cable television transmissions, satellite television transmissions, streaming video transmissions, e.g., via the Internet, encoding of digital video for storage on a data storage medium, decoding of digital video stored on a data storage medium, or other applications. In some examples, system 10 may be configured to support one-way or two-way video transmission to support applications such as video streaming, video playback, video broadcasting, and/or video telephony.

In the example of FIG. 1, source device 12 includes video source 18, video encoder 20, modulator/demodulator 22 and transmitter 24. In source device 12, video source 18 may include a source such as a video capture device, such as a video camera, a video archive containing previously captured video, a video feed interface to receive video from a video content provider, and/or a computer graphics system for generating computer graphics data as the source video, or a combination of such sources. As one example, if video source 18 is a video camera, source device 12 and destination device 14 may form so-called camera phones or video phones, which may be provided, e.g., within smartphones or tablet computers. However, the techniques described in this disclosure may be applicable to video coding in general, and may be applied to wireless and/or wired applications, or application in which encoded video data is stored on a local disk.

The captured, pre-captured, or computer-generated video may be encoded by video encoder 20. The encoded video information may be modulated by modem 22 according to a communication standard, such as a wired or wireless communication protocol, and transmitted to destination device 14 via transmitter 24. Modem 22 may include various mixers, filters, amplifiers or other components designed for signal modulation. Transmitter 24 may include circuits designed for transmitting data, including amplifiers, filters, and, in the case of wireless communication, one or more antennas.

The captured, pre-captured, or computer-generated video that is encoded by video encoder 20 may also be stored onto storage medium 34 or file server 36 for later consumption. Storage medium 34 may include Blu-ray discs, DVDs, CD-ROMs, flash memory, or any other suitable digital storage media for storing encoded video. The encoded video stored on the storage medium 34 may then be accessed by destination device 14 for decoding and playback. Although not shown in FIG. 1, in some examples, storage medium 34 and/or file server 36 may store the output of transmitter 24.

File server 36 may be any type of server capable of storing encoded video and transmitting that encoded video to destination device 14. Example file servers include a web server (e.g., for a website), an FTP server, network attached storage (NAS) devices, a local disk drive, or any other type of device capable of storing encoded video data and transmitting it to a destination device. The transmission of encoded video data from file server 36 may be a streaming transmission, a download transmission, or a combination of both. File server 36 may be accessed by destination device 14 through any standard data connection, including an Internet connection. This may include a wireless channel (e.g., a Wi-Fi connection), a wired connection (e.g., DSL, cable modem, Ethernet, USB, etc.), or a combination of both that is suitable for accessing encoded video data stored on a file server.

Destination device 14, in the example of FIG. 1, includes receiver 26, modem 28, video decoder 30, and display device 32. Receiver 26 of destination device 14 receives information over channel 16, and modem 28 demodulates the information to produce a demodulated bitstream for video decoder 30. The information communicated over channel 16 may include a variety of syntax information generated by video encoder 20 for use by video decoder 30 in decoding video data. Such syntax may also be included with the encoded video data stored on storage medium 34 or file server 36. Each of video encoder 20 and video decoder 30 may form part of a respective encoder-decoder (CODEC) that is capable of encoding or decoding video data.

Display device 32 may be integrated with, or external to, destination device 14. In some examples, destination device 14 may include an integrated display device and also be configured to interface with an external display device. In other examples, destination device 14 may be a display device. In general, display device 32 displays the decoded video data to a user, and may comprise any of a variety of display devices such as a liquid crystal display (LCD), a plasma display, an organic light emitting diode (OLED) display, or another type of display device.

In the example of FIG. 1, communication channel 16 may comprise any wireless or wired communication medium, such as a radio frequency (RF) spectrum or one or more physical transmission lines, or any combination of wireless and wired media. Communication channel 16 may form part of a packet-based network, such as a local area network, a wide-area network, or a global network such as the Internet. Communication channel 16 generally represents any suitable communication medium, or collection of different communication media, for transmitting video data from source device 12 to destination device 14, including any suitable combination of wired or wireless media. Communication channel 16 may include routers, switches, base stations, or any other equipment that may be useful to facilitate communication from source device 12 to destination device 14.

Video encoder 20 and video decoder 30 may operate according to a video compression standard, such as the High Efficiency Video Coding (HEVC) standard presently under development by the Joint Collaboration Team on Video Coding (JCT-VC) of ITU-T Video Coding Experts Group (VCEG) and ISO/IEC Motion Picture Experts Group (MPEG). A recent draft of the HEVC standard, referred to as "HEVC Working Draft 9" or "WD9," is described in document JCTVC-K1003v13, Bross et al., "High efficiency video coding (HEVC) text specification draft 9," Joint Collaborative Team on Video Coding (JCT-VC) of ITU-T SG16 WP3 and ISO/IEC JTC1/SC29/WG11, 11th Meeting: Shanghai, CN, 10-19 Oct. 2012, which, as of Mar. 19, 2013, is downloadable from http://phenix.int-evry.fr/jct/doc_en-d_user/documents/11_Shanghai/wg11/JCTVC-K1003-v13.zip. The entire content of HEVC WD9 is hereby incorporated herein by reference.

Although not shown in FIG. 1, in some aspects, video encoder 20 and video decoder 30 may each be integrated with an audio encoder and decoder, and may include appropriate MUX-DEMUX units, or other hardware and software, to handle encoding of both audio and video in a common data stream or separate data streams. If applicable, in some examples, MUX-DEMUX units may conform to the ITU H.223 multiplexer protocol, or other protocols such as the user datagram protocol (UDP).

Video encoder 20 and video decoder 30 each may be implemented as any of a variety of suitable encoder circuitry, such as one or more microprocessors, digital signal processors (DSPs), application specific integrated circuits (ASICs), field programmable gate arrays (FPGAs), discrete logic, software, hardware, firmware or any combinations thereof. When the techniques are implemented partially in software, a device may store instructions for the software in a suitable, non-transitory computer-readable medium and execute the instructions in hardware using one or more processors to perform the techniques of this disclosure. Each of video encoder 20 and video decoder 30 may be included in one or more encoders or decoders, either of which may be integrated as part of a combined encoder/decoder (CODEC) in a respective device.

Video encoder 20 may implement any or all of the techniques of this disclosure for coding transform coefficients in a video coding process. Likewise, video decoder 30 may implement any or all of these techniques for coding transform coefficients in a video coding process. A video coder, as described in this disclosure, may refer to a video encoder or a video decoder. Similarly, a video coding unit may refer to a video encoder or a video decoder. Likewise, video coding may refer to video encoding or video decoding.

In one example of the disclosure, as will be explained in more detail below, video encoder 20 may be configured to determine that no transform coefficient in a subset of transform coefficients has an absolute value greater than one, and, based on the determination, skip one or more encoding passes on the subset of transform coefficients, the encoding passes relating to encoding level information associated with the subset of transform coefficients.

Likewise, video decoder 30 may be configured to determine that no transform coefficient in a subset of transform coefficients has an absolute value greater than one, and, based on the determination, skip one or more decoding passes on the subset of transform coefficients, the decoding passes relating to decoding level information associated with the subset of transform coefficients.

Digital video devices implement video compression techniques to encode and decode digital video information more efficiently. Video compression may apply spatial (intra-frame) prediction and/or temporal (inter-frame) prediction techniques to reduce or remove redundancy inherent in video sequences.

The JCT-VC is working on development of the HEVC standard, e.g., as described in the HEVC WD9 discussed above. The HEVC standardization efforts are based on an evolving model of a video coding device referred to as the HEVC Test Model (HM). The HM presumes several additional capabilities of video coding devices relative to existing devices according to, e.g., ITU-T H.264/AVC. For example, whereas H.264 provides nine intra-prediction encoding modes, the HM may provide as many as thirty-three intra-prediction encoding modes. The following section will discuss certain aspects of the HM in more detail.

For video coding according to the HEVC standard currently under development, a video frame may be partitioned into coding units. A coding unit (CU) generally refers to an image region that serves as a basic unit to which various coding tools are applied for video compression. A CU usually has a luminance component, denoted as Y, and two chroma components, denoted as U and V. Depending on the video sampling format, the size of the U and V components, in terms of number of samples, may be the same as or different from the size of the Y component.

A CU is typically square, and may be considered to be similar to a so-called macroblock, e.g., under other video coding standards such as ITU-T H.264. Coding according to some of the presently proposed aspects of the developing HEVC standard will be described in this application for purposes of illustration. However, the techniques described in this disclosure may be useful for other video coding processes, such as those defined according to H.264 or other standard or proprietary video coding processes.

According to the HM, a CU may include one or more prediction units (PUs) and/or one or more transform units (TUs). Syntax data within a bitstream may define a largest coding unit (LCU), which is a largest CU in terms of the number of pixels. In general, a CU has a similar purpose to a macroblock of H.264, except that a CU does not have a size distinction. Thus, a CU may be split into sub-CUs. In general, references in this disclosure to a CU may refer to a largest coding unit of a picture or a sub-CU of an LCU. An LCU may be split into sub-CUs, and each sub-CU may be further split into sub-CUs. Syntax data for a bitstream may define a maximum number of times an LCU may be split, referred to as CU depth. Accordingly, a bitstream may also define a smallest coding unit (SCU). This disclosure also uses the term "block" or "portion" to refer to any of a CU, PU, or TU. In general, "portion" may refer to any sub-set of a video frame.

An LCU may be associated with a quadtree data structure. In general, a quadtree data structure includes one node per CU, where a root node corresponds to the LCU. If a CU is split into four sub-CUs, the node corresponding to the CU includes four leaf nodes, each of which corresponds to one of the sub-CUs. Each node of the quadtree data structure may provide syntax data for the corresponding CU. For example, a node in the quadtree may include a split flag, indicating whether the CU corresponding to the node is split into sub-CUs. Syntax elements for a CU may be defined recursively, and may depend on whether the CU is split into sub-CUs. If a CU is not split further, it is referred as a leaf-CU. In this disclosure, 4 sub-CUs of a leaf-CU will also be referred to as leaf-CUs although there is no explicit splitting of the original leaf-CU. For example if a CU at 16×16 size is not split further, the four 8×8 sub-CUs will also be referred to as leaf-CUs although the 16×16 CU was never split.

A leaf-CU may include one or more prediction units (PUs). In general, a PU represents all or a portion of the corresponding CU, and may include data for retrieving a reference sample for the PU. For example, when the PU is inter-mode encoded, the PU may include data defining a motion vector for the PU. The data defining the motion vector may describe, for example, a horizontal component of the motion vector, a vertical component of the motion vector, a resolution for the motion vector (e.g., one-quarter pixel precision or one-eighth pixel precision), a reference frame to which the motion vector points, and/or a reference list (e.g., list 0 or list 1) for the motion vector. Data for the leaf-CU defining the PU(s) may also describe, for example, partitioning of the CU into one or more PUs. Partitioning modes may differ depending on whether the CU is uncoded, intra-prediction mode encoded, or inter-prediction mode encoded. For intra coding, a PU may be treated the same as a leaf transform unit described below.

The emerging HEVC standard allows for transformations according to transform units (TUs), which may be different for different CUs. The TUs are typically sized based on the size of PUs within a given CU defined for a partitioned LCU, although this may not always be the case. The TUs are typically the same size or smaller than the PUs. In some examples, residual samples corresponding to a CU may be subdivided into smaller units using a quadtree structure known as "residual quad tree" (RQT). The leaf nodes of the RQT may be referred to as transform units (TUs). Pixel difference values associated with the TUs may be transformed to produce transform coefficients, which may be quantized. A TU includes a luma transform block and two chroma transform blocks. As such, any coding process discussed below that is applied to a TU, may be, in actuality, applied to the luma and chroma transform blocks.

In general, a PU refers to data related to the prediction process. For example, when the PU is intra-mode encoded, the PU may include data describing an intra-prediction mode for the PU. As another example, when the PU is inter-mode encoded, the PU may include data defining a motion vector for the PU.

In general, a TU is used for the transform and quantization processes. A given CU having one or more PUs may also include one or more transform units (TUs). Following prediction, video encoder 20 may calculate residual values from the video block identified by the coding node in accordance with the PU. The coding node is then updated to reference the residual values rather than the original video block. The residual values comprise pixel difference values that may be transformed into transform coefficients, quantized, and scanned using the transforms and other transform information specified in the TUs to produce serialized transform coefficients for entropy coding. The coding node may once again be updated to refer to these serialized transform coefficients. This disclosure typically uses the term "video block" to refer to a coding node of a CU. In some specific cases, this disclosure may also use the term "video block" to refer to a treeblock, i.e., LCU, or a CU, which includes a coding node and PUs and TUs.

A video sequence typically includes a series of video frames or pictures. A group of pictures (GOP) generally comprises a series of one or more of the video pictures. A GOP may include syntax data in a header of the GOP, a header of one or more of the pictures, or elsewhere, that describes a number of pictures included in the GOP. Each slice of a picture may include slice syntax data that describes an encoding mode for the respective slice. Video encoder 20 typically operates on video blocks within individual video slices in order to encode the video data. A video block may correspond to a coding node within a CU. The video blocks may have fixed or varying sizes, and may differ in size according to a specified coding standard.

To code a block (e.g., a prediction unit of video data), a predictor for the block is first derived. The predictor, also referred to as a predictive block, can be derived either through intra (I) prediction (i.e., spatial prediction) or inter (P or B) prediction (i.e. temporal prediction). Hence, some prediction units may be intra-coded (I) using spatial prediction with respect to reference samples in neighboring reference blocks in the same frame (or slice), and other prediction units may be uni-directionally inter-coded (P) or bi-directionally inter-coded (B) with respect to blocks of reference samples in other previously-coded frames (or slices). In each case, the reference samples may be used to form a predictive block for a block to be coded.

Upon identification of a predictive block, the difference between the pixels in the original video data block and the pixels in its predictive block is determined. This difference may be referred to as the prediction residual data, and indicates the pixel differences between the pixel values in the block to the coded and the pixel values in the predictive block selected to represent the coded block. To achieve better compression, the prediction residual data may be transformed, e.g., using a discrete cosine transform (DCT), an integer transform, a Karhunen-Loeve (K-L) transform, or another transform to produce transform coefficients.

The residual data in a transform block, such as a TU, may be arranged in a two-dimensional (2D) array of pixel difference values residing in the spatial, pixel domain. A transform converts the residual pixel values into a two-dimensional array of transform coefficients in a transform domain, such as a frequency domain.

For further compression, the transform coefficients may be quantized prior to entropy coding. An entropy coder then applies entropy coding, such as Context Adaptive Variable Length Coding (CAVLC), Context Adaptive Binary Arithmetic Coding (CABAC), Probability Interval Partitioning Entropy Coding (PIPE), or the like, to the quantized transform coefficients. In some examples, video encoder 20 may utilize a predefined scan order to scan the quantized transform coefficients to produce a serialized vector that can be entropy encoded. In other examples, video encoder 20 may perform an adaptive scan. After scanning the quantized transform coefficients to form a one-dimensional vector, video encoder 20 may entropy encode the one-dimensional vector, Video encoder 20 may also entropy encode syntax elements associated with the encoded video data for use by video decoder 30 in decoding the video data.

This disclosure is related techniques for context adaptive binary arithmetic coding (CABAC) entropy coders or other entropy coders, such as probability interval partitioning entropy coding (PIPE) or related coders. Arithmetic coding is a form of entropy coding used in many compression algorithms that have high coding efficiency, because it is capable of mapping symbols to non-integer length codewords. An example of an arithmetic coding algorithm is Context Based Binary Arithmetic Coding (CABAC) used in H.264/AVC.

In general, entropy coding data symbols using CABAC involves one or more of the following steps:

(1) Binarization: If a symbol to be coded is non-binary valued, it is mapped to a sequence of so-called "bins." Each bin can have a value of "0" or "1."

(2) Context Assignment: Each bin (in regular mode) is assigned to a context. A context model determines how a context for a given bin is calculated based on information available for the bin, such as values of previously encoded symbols or bin number.

(3) Bin encoding: Bins are encoded with an arithmetic encoder. To encode a bin, the arithmetic encoder requires as an input a probability of the bin's value, i.e., a probability that the bin's value is equal to "0," and a probability that the bin's value is equal to "1." The (estimated) probability of each context is represented by an integer value called a "context state." Each context has a state, and thus the state (i.e., estimated probability) is the same for bins assigned to one context, and differs between contexts.

(4) State update: The probability (state) for a selected context is updated based on the actual coded value of the bin (e.g., if the bin value was "1," the probability of "1's" is increased).

It should be noted that probability interval partitioning entropy coding (PIPE) uses principles similar to those of arithmetic coding, and can thus also utilize the techniques of this disclosure.

CABAC in H.264/AVC and HEVC uses states, and each state is implicitly related to a probability. There are variants of CABAC, in which a probability of a symbol ("0" or "1") is used directly, i.e., the probability (or an integer version of it) is the state. For example, such variants of CABAC are described in "Description of video coding technology proposal by France Telecom, NTT, NTT DOCOMO, Panasonic and Technicolor," JCTVC-A114, 1st JCT-VC Meeting, Dresden, DE, April 2010, referred to as "JCTVC-A114" hereinafter, and A. Alshin and E. Alshina, "Multi-parameter probability update for CABAC," JCTVC-F254, 6th JCT-VC Meeting, Torino, IT, July 2011, referred to as "JCTVC-F254" hereinafter.

To entropy code a block of quantized transform coefficients, a scanning process is usually performed so that the two-dimensional (2D) array of quantized transform coefficients in a block is rearranged, according to a particular scan order, into an ordered, one-dimensional (1D) array, i.e., vector, of transform coefficients. Entropy coding is then applied to the vector of transform coefficients. The scan of the quantized transform coefficients in a transform unit serializes the 2D array of transform coefficients for the entropy coder. A significance map may be generated to indicate the positions of significant (i.e., non-zero) coefficients. Scanning may be applied to scan levels of significant (i.e., nonzero) coefficients, and/or to code signs of the significant coefficients.

In the HEVC standard, position information of the significant transform (e.g., the significance map) is first coded for a transform block to indicate the location of the last non-zero coefficient in the scan order. The significance map and the level information (the absolute values and signs of the coefficients) are coded for each coefficient in an inverse scan order.

Figure 2:
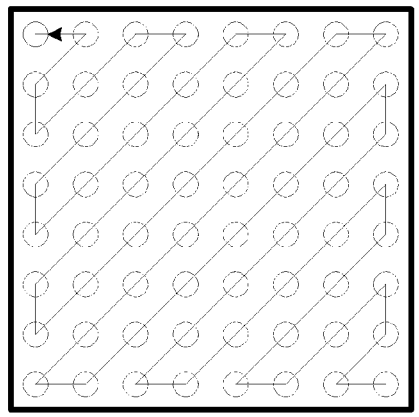
FIG. 2 is a conceptual drawing showing example inverse scan orders for transform coefficient coding.
Figure 2:
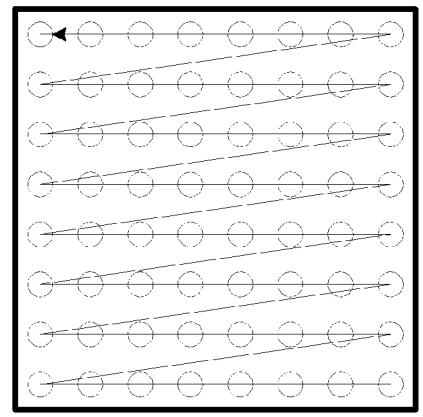
Figure 2:
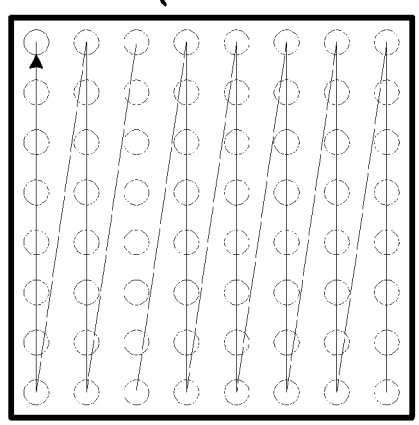
Figure 2:
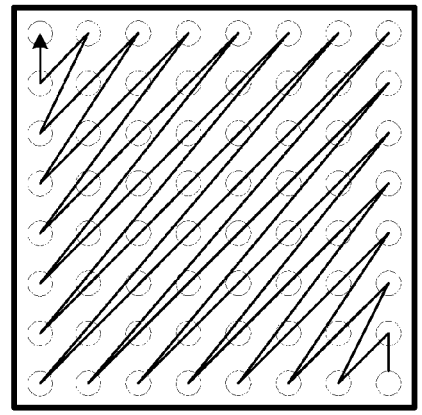

Currently, there are three different scans in HEVC: a subblock diagonal scan, a subblock horizontal scan, and a subblock vertical scan. FIG. 2 shows examples of inverse scan orders for a block of transform coefficients. Note that each of the inverse diagonal pattern 35, inverse zig-zag pattern 29, inverse vertical pattern 31, and the inverse horizontal pattern 33 proceed from the higher frequency coefficients in the lower right corner of the transform block to lower frequency coefficients in the upper left corner of the transform block.

The subblock diagonal scan, subblock horizontal scan, and subblock vertical scan are applied for 4×4 and 8×8 transform blocks. The subblock based diagonal scan is employed in 16×16 and 32×32 transform blocks in the current HEVC test model. In some examples, the subblock based diagonal scan could also be applied to an 8×8 TU. In a subblock based scan, one 4×4 subblock of a larger transform block is scanned before proceeding to another 4×4 subblock within the larger transform block. In other examples, a "subblock" may consist of a number of consecutively scanned coefficients according to the scan order used. For example, the "subblock" may consist of 16 consecutively scanned coefficients along a diagonal scan order.

Figure 3:
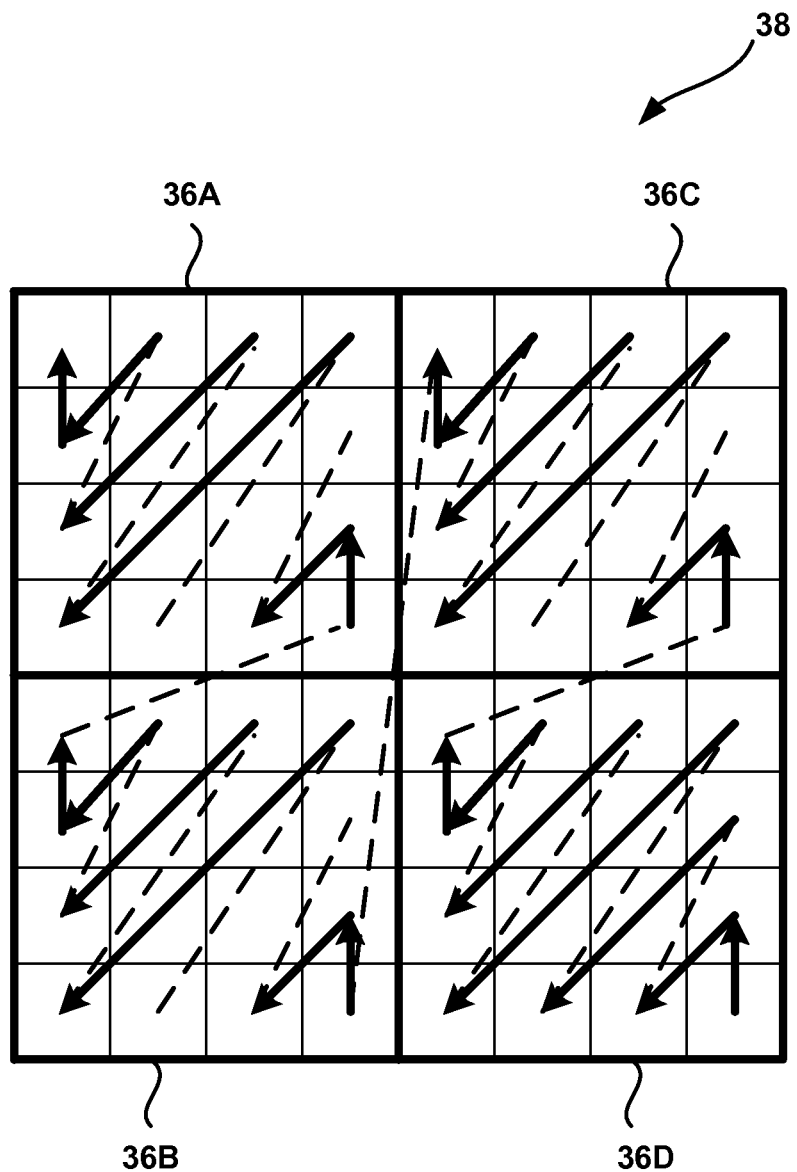
FIG. 3 is a conceptual drawing showing an example subblock-based diagonal scan.

FIG. 3 depicts an example of a subblock based scan on an 8×8 transform block. 8×8 transform block 38 consists of four 4×4 subblocks (36A, 36B, 36C, 36D). As shown in FIG. 3, transform coefficients in subblock 36D are scanned before scanning transform coefficients in subblock 36C. The scan then proceeds from subblock 36C to subblock 36B, and finally to subblock 36A. FIG. 3 depicts an inverse diagonal scanning order in each subblock; however, any scanning order may be used (e.g., horizontal, vertical, zigzag, etc.). In other examples, forward scanning orders are used within each subblock.

In the emergent HEVC standard, coefficients may be grouped into a chunk or subset. The significance map and level information (absolute value and sign) of the transform coefficients are coded for each subset. In one example, a subset consists of 16 consecutive coefficients along a scan order (e.g., a forward or inverse diagonal, horizontal, or vertical scan order) for a 4×4 transform block and an 8×8 transform block. For 16×16 and 32×32 transform blocks, a 4×4 subblock (or subset) of transform coefficients within the larger transform block are treated as a subset. The following symbols are coded and signaled to represent the coefficients level information within a subset. In one example, all the symbols are encoded in an inverse scan order. It should be noted that the following symbols may be referred to as "flags." It should be noted that any of the "flags" discussed in this disclosure need not be limited to a binary symbol, but may also be implemented as multiple bit syntax elements.

significant_coeff_flag (abbr. sigMapFlag): This flag indicates the significance of each coefficient in a subset. A coefficient with an absolute value of greater than zero is considered to be significant. As one example, a sigMapFlag value of 0 indicates that the coefficient is not significant, while a value of 1 indicates that the coefficient is significant. This flag may generally be referred to as a significance flag.

coeff_abs_level_greater1_flag (abbr. gr1Flag): This flag indicates whether the absolute value of the coefficient is larger than one for any non-zero coefficients (i.e., coefficients with sigMapFlag as 1 or where the sigMapFlag is implicitly derived as 1). As one example, a gr1Flag value of 0 indicates that the coefficient does not have an absolute value greater than one, while a value of 1 for the gr1Flag indicates that the coefficient does have an absolute value greater than one. This flag may generally be referred to as a greater-than-one flag.

coeff_abs_level_greater2_flag (abbr. gr2Flag): This flag indicates whether the absolute value of the coefficient is larger than two for any coefficients with an absolute value larger than one (i.e., coefficients with gr1Flag as 1). As one example, a gr2Flag value of 0 indicates that the coefficient does not have an absolute value greater than two, while a value of 1 for the gr2Flag indicates that the coefficient does have an absolute value greater than two. This flag may generally be referred to as a greater-than-two flag.

coeff_sign_flag (abbr. signFlag): This flag indicates the sign information for any non-zero coefficients (i.e., coefficients with sigMapFlag as 1). For example, a zero for this flag indicates a positive sign, while a 1 indicates a negative sign.

coeff_abs_level_remaining (abbr. levelRem): This syntax element indicates the absolute level values of the remaining coefficients. Generally, for this syntax element, the absolute value of the coefficient minus three is coded (abs(level)−3) for each coefficient with an absolute value larger than two (i.e. coefficients with gr2Flag as 1).

Figure 4:
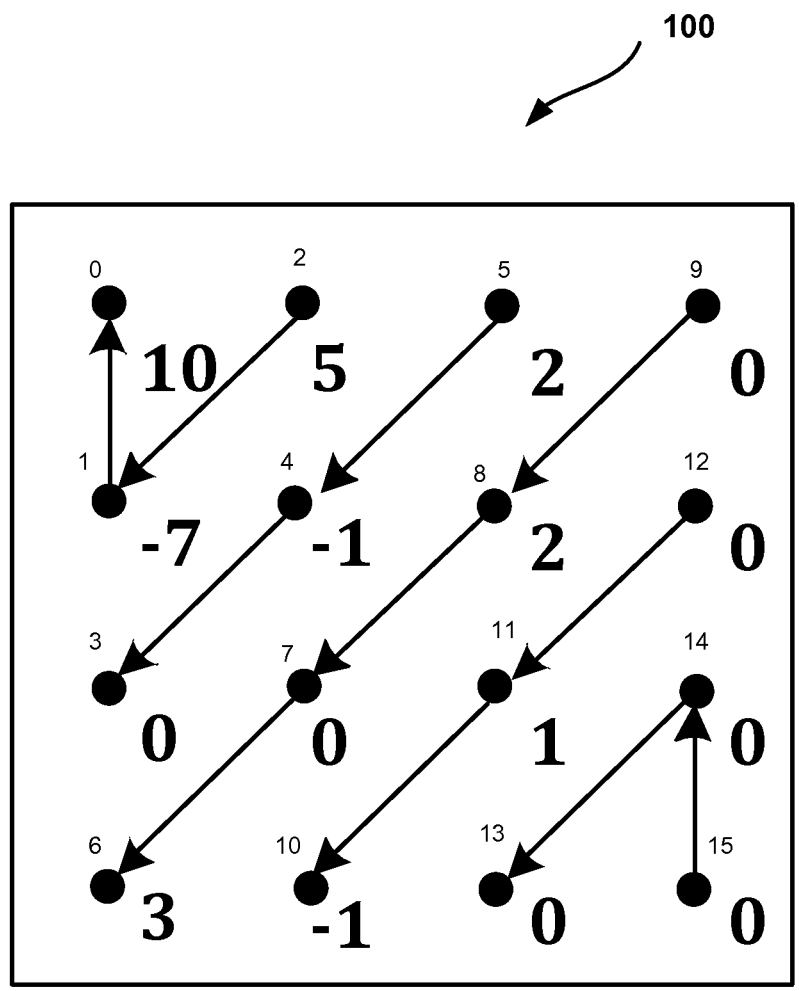
FIG. 4 is a conceptual drawing showing an example inverse diagonal scan of a 4×4 subset of transform coefficients.

FIG. 4 shows an example of quantized coefficients in a 4×4 block 100. Block 100 may be a 4×4 transform block or may be a 4×4 subblock (subset) in an 8×8, 16×16 or 32×32 transform block. The encoded symbols for the coefficients shown in FIG. 4, scanned in an inverse scan order, are summarized in Table 1. In Table 1, scan_pos refers to the position of the coefficient along the inverse diagonal scan shown in FIG. 4. Scan_pos 15 is the first coefficient scanned and is located in the lower right corner of block 100. The quantized coefficient at scan_pos 15 has an absolute value of 0. Scan_pos 0 is the last coefficient scanned and is located in the upper left corner of block 100. The quantized coefficient at scan_pos 0 has an absolute value of 10. In the case of a 4×4 transform block transform block or the last 4×4 subblock in a larger transform block, the first four sigMapFlags do not need to be coded, since the position of the last non-zero coefficient is known. That is, coding of the sigMapFlag may begin at the last non-zero coefficient (in this example, the coefficient at scan_pos 11).

TABLE 1

Coded symbols for the coefficients of a 4 × 4 transform block or a 4 × 4 subset

| Scan_pos | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|
| Coefficients | 0 | 0 | 0 | 0 | 1 | −1 | 0 | 2 | 0 | 3 | 2 | −1 | 0 | 5 | −7 | 10 |
| sigMapFlag | 0 | 0 | 0 | 0 | 1 | 1 | 0 | 1 | 0 | 1 | 1 | 1 | 0 | 1 | 1 | 1 |
| gr1Flag | | | | | 0 | 0 | | 1 | | 1 | 1 | 0 | | 1 | 1 | 1 |
| gr2Flag | | | | | | | | 0 | | 1 | 0 | | | 1 | 1 | 1 |
| signFlag | | | | | 0 | 1 | | 0 | | 0 | 0 | 1 | | 1 | 0 | 1 | 0 |
| levelRem | | | | | | | | | | 0 | | | | 2 | 4 | 7 |

Among these symbols, the bins of sigMapFlag, gr1Flag and gr2Flag are encoded with adaptive context models. The signFlag and binarized bins of levelRem are encoded through bypass mode with fixed equal probability model (e.g., with an Exponential-Golomb code).

It should be noted that in HEVC WD9, an additional flag (i.e., a significant_coeff_group_flag) has been designated to indicate whether or not there are any significant coefficients in a subset/subblock. That is, if significant_coeff_group_flag equals 1, for example, the subset contains significant coefficients. As such, significance and level coding proceeds as described above. However, if significant_coeff_group_flag is equal to 0, for example, the subset does not contain significant coefficients. As such, additional coding of significance and level information is not needed and may be skipped.

This disclosure proposes to extend the concept of the significant_coeff_group_flag to other flags that may be used to skip potentially unnecessary coding of additional level information (e.g., the gr1Flag and the gr2Flag) in a chunk or subset. In this disclosure, the terms chunk or subset may be used interchangeably, and generally refer to a group of transform coefficients in a transform block. Note, that in some instances a chunk or subset may constitute an entire transform block, i.e., all of the coefficients of the transform block. In other instances, a chunk or subset may constitute a portion (subblock) of the coefficients of the transform block that are less than the entire transform block.

As one example, when there are significant coefficients in a subset (e.g., as indicated by a significant_coeff_group_flag), after video encoder 20 or video decoder 30 completes the coding pass corresponding to sigMapFlag, an additional group flag (e.g., an abs_level_greater1_group_flag) is coded to indicate whether or not the subset includes any significant coefficients greater than one. A zero value for the abs_level_greater1_group_flag indicates that no coefficient in the subset has an absolute value greater than 1. In this case, video encoder 20 and video decoder 30 may skip the coding passes corresponding to level information, namely gr1Flag, gr2Flag and levelRem for the subset. Only the coding pass related to the sign is still processed. If the abs_level_greater1_group_flag is 1, video encoder 20 and video decoder 30 proceed in the coding pass to the gr1Flag, as described above. In this way, unnecessary coding of the gr1Flag, gr2Flag, and levelRem for individual coefficients in a subset may be avoided when the subset contains no significant coefficients greater than 1.

In some circumstances, the value of the abs_level_greater1_group_flag may be inferred to be one instead of being explicitly coded. As one example, if the particular subset contains the DC coefficient (i.e., the coefficient at the upper left corner of the transform block), video encoder 20 and video decoder 30 may infer the abs_level_greater1_group_flag to be one. That is, rather than explicitly encoding or decoding the abs_level_greater1_group_flag, video encoder 20 and video decoder 30 may determine the value of the abs_level_greater1_group_flag based on the presence of the DC coefficient alone. Thus, coding of the additional level information (gr1Flag, gr2Flag and levelRem) for the subset may proceed.

This inference may be made because the subset containing the DC coefficient having a coefficient with an absolute value larger than one is a high probability occurrence. Similarly, if the number of significant coefficients in a subset is higher than some predetermined threshold, the abs_level_greater1_group_flag may also be inferred to be one. For example, the abs_level_greater1_group_flag may be inferred to be 1 for a 16 coefficient subset having four significant coefficients. This inference may be made because subsets with a relatively large number of coefficients are most likely going to contain coefficients that have an absolute value larger than one.

In certain other cases, the encoding or decoding of the abs_level_greater1_group_flag may also be skipped (i.e., inferred to be 1, indicating coefficients having an absolute value greater than one are in the subset). In these cases, coding may directly proceed to a gr1Flag coding pass after significance coding. For example, the abs_level_greater1_group_flag may be inferred to be 1 if the number of significant coefficients in a subset is less than another threshold (e.g., 3). Instead, the gr1Flag for each of the significant coefficients may be coded directly. In this example, when there are very few significant coefficients, coding an additional flag (i.e., the abs_level_greater1_group_flag) to potentially turn off coding the gr1Flag may be of limited benefit, because there would be very few gr1Flags to code. In another example, the decision on whether to code the abs_level_greater1_group_flag (i.e., as opposed to implicitly inferring it) may depend on the position of the significant coefficients within the sub-block. For example, a subblock having non-zero coefficients that are sparsely distributed through the subblock are less likely to have coefficients with an absolute value greater than one than a subblock where the non-zero coefficients are grouped together.

Like the sigMapFlag, gr1Flag, and gr2Flag, the abs_level_greater1_group_flag may be context-coded. In one example, the context used to code the abs_level_greater1_group_flag may depend on the value of an abs_level_greater1_group_flag of a subset to the right and/or a subset below (for reverse scans) the current subset. If the neighboring subset is outside the transform block, that subset's abs_level_greater1_group_flag is assumed to be zero. If an abs_level_greater1_group_flag was not coded for a neighboring subset, it is inferred to be one.

If a neighboring subset includes transform coefficients with an absolute value of greater than one (as indicated by the abs_level_greater1_group_flag), it is more likely that the current subset also includes transform coefficients with an absolute value greater than one. As such, a context may be chosen to code, using CABAC, the abs_level_greater1_group_flag for the current subset given this increased probability. Likewise, if a neighboring subset does not include transform coefficients with an absolute value of greater than one (as indicated by the abs_level_greater1_group_flag), it is less likely that the current subset includes transform coefficients with an absolute value greater than one. As such, a different context may be chosen to code the abs_level_greater1_group_flag for the current subset given this decreased probability.

In another example of the disclosure, the context for coding the abs_level_greater1_group_flag may additionally depend on the number of significant coefficients in the current subset. That is, the more significant coefficients there are in a given subset, the higher the probability that the subset include transform coefficients with an absolute value of greater than one. A context may then be selected to reflect this increased probability.

The abs_level_greater1_group_flag may also be used to infer the gr1Flag in some situations. Consider an example where the abs_level_greater1_group_flag for a subset is 1 (i.e., indicating that there are transform coefficient with an absolute value greater than 1). If all the significant coefficients in a subset, except the last one in the scan order, have gr1Flags equal to 0 (indicating that the coefficient is not greater than one), then gr1Flag for the last significant coefficient is inferred to be 1, and hence, it is not coded.

The same concepts described above with regard to an abs_level_greater1_group_flag can be extended to an abs_level_greater2_group_flag. In this case, when a subset has at least one coefficient with absolute level value greater than 1, after the gr1Flag coding pass, an abs_level_greater2_group_flag is coded. A zero value for the abs_level_greater2_group_flag indicates that no coefficient in the subset has an absolute value greater than 2. In this case, the coding passes corresponding to gr2Flag and levelRem are skipped. Only the coding pass related to sign is included. If the abs_level_greater2_group_flag is 1, indicating that the subset does include coefficients with an absolute value greater than 2, the coding proceeds to the gr2Flag.

In some circumstances, the value of abs_level_greater2_group_flag may be inferred to be one instead of being explicitly coded. As an example, if a subset contains the DC coefficient, then the abs_level_greater2_group_flag may be inferred to be one. Similarly, if the number of significant coefficients in a subset is higher than a predetermined threshold, and/or the number of coefficients in a subset with absolute level greater than 1 are above another threshold, the abs_level_greater2_group_flag may be inferred to be one. Assuming a 16 coefficient subset, a typical threshold may be 4 for the number of coefficient larger than one, and 4 or 8 for the number of significant coefficients.

In certain other cases, the coding of the abs_level_greater2_group_flag may also be skipped (i.e., inferred to be 1). In these cases, coding of level information would directly proceed to the gr2Flag. For example, if the number of significant coefficients in a subset is below a certain threshold (1 or 2) and/or the number of coefficients with absolute value greater than 1 is below another threshold, the abs_level_greater2_group_flag may not be coded and instead, the value for each of the coefficients with gr1Flag=1 (i.e., with an absolute value greater than one) may be coded directly. Also, the decision of whether to code the abs_level_greater2_group_flag may depend on the position of the significant coefficients and/or the number of coefficients with gr1Flag=1 within the sub-block.

The abs_level_greater2_group_flag may also be context-coded. In one example, the context used to code the abs_level_greater2_group_flag may be selected based on the value of an abs_level_greater2_group_flag of a subset to the right and a subset below the current subset. If the neighboring subset is outside the transform block, or if abs_level_greater1_group_flag was not coded for that subset, the abs_level_greater2_group_flag for that subset is assumed to be zero.

If a neighboring subset includes transform coefficients with an absolute value of greater than two (as indicated by the abs_level_greater2_group_flag), it is more likely that the current subset also includes transform coefficients with an absolute value greater than two. As such, a context may be chosen to code the abs_level_greater2_group_flag for the current subset given this increased probability. Likewise, if a neighboring subset does not include transform coefficients with an absolute value of greater than two (as indicated by the abs_level_greater2_group_flag), it is less likely that the current subset includes transform coefficients with an absolute value greater than two. As such, a different context may be chosen to code, using CABAC, the abs_level_greater2_group_flag for the current subset given this decreased probability.

In another example, the context for coding the abs_level_greater2_group_flag may additionally depend on the number of significant coefficients in the current subset and the number of coefficients with absolute level greater than 1 in the current subset.

The abs_level_greater2_group_flag may also be used to infer the gr2Flag in some situations. Consider an example where the abs_level_greater2_group_flag for a subset is 1. If all the coefficients with absolute value greater than 1, except the last one in the scan order, have gr2Flags equal to 0, the gr2Flag for the last coefficient with absolute level value greater than 1 is inferred to be 1 and hence, it is not coded.

Figure 5:
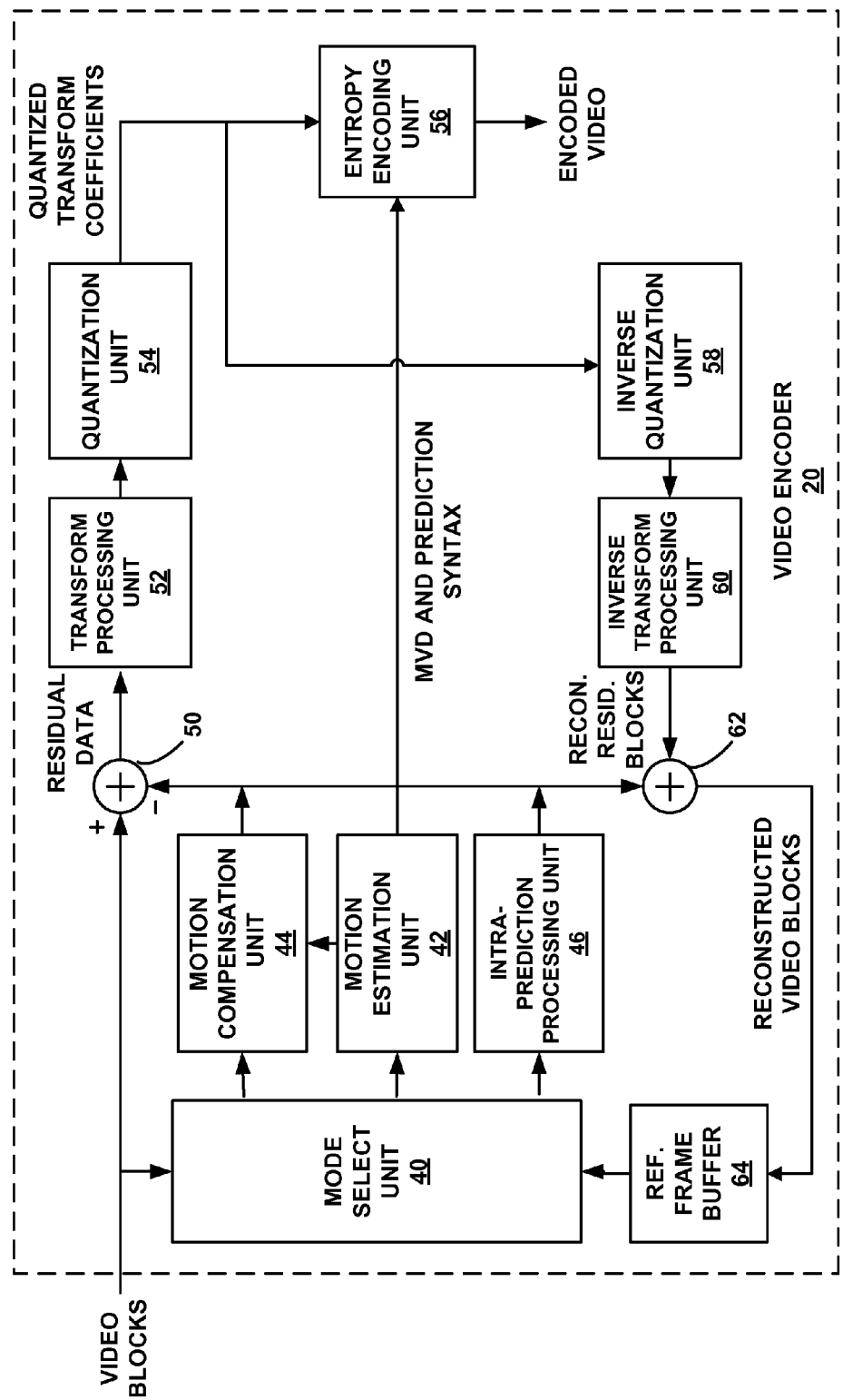
FIG. 5 is a block diagram illustrating an example video encoder.

FIG. 5 is a block diagram illustrating an example of a video encoder 20 that may use techniques for coding transform coefficients as described in this disclosure. The video encoder 20 will be described in the context of HEVC coding for purposes of illustration, but without limitation of this disclosure as to other coding standards or methods that may require scanning of transform coefficients. The video encoder 20 may perform intra- and inter-coding of CUs within video frames. Intra-coding relies on spatial prediction to reduce or remove spatial redundancy in video data within a given video frame. Inter-coding relies on temporal prediction to reduce or remove temporal redundancy between a current frame and previously coded frames of a video sequence. Intra-mode (I-mode) may refer to any of several spatial-based video compression modes. Inter-modes such as uni-directional prediction (P-mode) or bi-directional prediction (B-mode) may refer to any of several temporal-based video compression modes.

As shown in FIG. 5, the video encoder 20 receives a current video block within a video frame to be encoded. In the example of FIG. 5, the video encoder 20 includes a motion compensation unit 44, a motion estimation unit 42, an intra-prediction processing unit 46, a reference frame buffer 64, a summer 50, a transform processing unit 52, a quantization unit 54, and an entropy encoding unit 56. The transform processing unit 52 illustrated in FIG. 5 is the unit that applies the actual transform or combinations of transform to a block of residual data, and is not to be confused with a block of transform coefficients, which also may be referred to as a transform unit (TU) of a CU. For video block reconstruction, the video encoder 20 also includes an inverse quantization unit 58, an inverse transform processing unit 60, and a summer 62. A deblocking filter (not shown in FIG. 5) may also be included to filter block boundaries to remove blockiness artifacts from reconstructed video. If desired, the deblocking filter would typically filter the output of the summer 62.

During the encoding process, the video encoder 20 receives a video frame or slice to be coded. The frame or slice may be divided into multiple video blocks, e.g., largest coding units (LCUs). The motion estimation unit 42 and the motion compensation unit 44 perform inter-predictive coding of the received video block relative to one or more blocks in one or more reference frames to provide temporal compression. The intra-prediction processing unit 46 may perform intra-predictive coding of the received video block relative to one or more neighboring blocks in the same frame or slice as the block to be coded to provide spatial compression.

The mode select unit 40 may select one of the coding modes, intra or inter, e.g., based on error (i.e., distortion) results for each mode, and provides the resulting intra- or inter-predicted block (e.g., a prediction unit (PU)) to the summer 50 to generate residual block data and to the summer 62 to reconstruct the encoded block for use in a reference frame. Summer 62 combines the predicted block with inverse quantized, inverse transformed data from inverse transform processing unit 60 for the block to reconstruct the encoded block, as described in greater detail below. Some video frames may be designated as I-frames, where all blocks in an I-frame are encoded in an intra-prediction mode. In some cases, the intra-prediction processing unit 46 may perform intra-prediction encoding of a block in a P- or B-frame, e.g., when the motion search performed by the motion estimation unit 42 does not result in a sufficient prediction of the block.

The motion estimation unit 42 and the motion compensation unit 44 may be highly integrated, but are illustrated separately for conceptual purposes. Motion estimation (or motion search) is the process of generating motion vectors, which estimate motion for video blocks. A motion vector, for example, may indicate the displacement of a prediction unit in a current frame relative to a reference sample of a reference frame. The motion estimation unit 42 calculates a motion vector for a prediction unit of an inter-coded frame by comparing the prediction unit to reference samples of a reference frame stored in the reference frame buffer 64. A reference sample may be a block that is found to closely match the portion of the CU including the PU being coded in terms of pixel difference, which may be determined by sum of absolute difference (SAD), sum of squared difference (SSD), or other difference metrics. The reference sample may occur anywhere within a reference frame or reference slice, and not necessarily at a block (e.g., coding unit) boundary of the reference frame or slice. In some examples, the reference sample may occur at a fractional pixel position.

The motion estimation unit 42 sends the calculated motion vector to the entropy encoding unit 56 and the motion compensation unit 44. The portion of the reference frame identified by a motion vector may be referred to as a reference sample. The motion compensation unit 44 may calculate a prediction value for a prediction unit of a current CU, e.g., by retrieving the reference sample identified by a motion vector for the PU.

The intra-prediction processing unit 46 may intra-predict the received block, as an alternative to inter-prediction performed by the motion estimation unit 42 and the motion compensation unit 44. The intra-prediction processing unit 46 may predict the received block relative to neighboring, previously coded blocks, e.g., blocks above, above and to the right, above and to the left, or to the left of the current block, assuming a left-to-right, top-to-bottom encoding order for blocks. The intra-prediction processing unit 46 may be configured with a variety of different intra-prediction modes. For example, the intra-prediction processing unit 46 may be configured with a certain number of directional prediction modes, e.g., thirty-three directional prediction modes, based on the size of the CU being encoded.

The intra-prediction processing unit 46 may select an intra-prediction mode by, for example, calculating error values for various intra-prediction modes and selecting a mode that yields the lowest error value. Directional prediction modes may include functions for combining values of spatially neighboring pixels and applying the combined values to one or more pixel positions in a PU. Once values for all pixel positions in the PU have been calculated, the intra-prediction processing unit 46 may calculate an error value for the prediction mode based on pixel differences between the PU and the received block to be encoded. The intra-prediction processing unit 46 may continue testing intra-prediction modes until an intra-prediction mode that yields an acceptable error value is discovered. The intra-prediction processing unit 46 may then send the PU to the summer 50.

The video encoder 20 forms a residual block by subtracting the prediction data calculated by the motion compensation unit 44 or the intra-prediction processing unit 46 from the original video block being coded. The summer 50 represents the component or components that perform this subtraction operation. The residual block may correspond to a two-dimensional matrix of pixel difference values, where the number of values in the residual block is the same as the number of pixels in the PU corresponding to the residual block. The values in the residual block may correspond to the differences, i.e., error, between values of co-located pixels in the PU and in the original block to be coded. The differences may be chroma or luma differences depending on the type of block that is coded.

The transform processing unit 52 may form one or more transform units (TUs) from the residual block. The transform processing unit 52 selects a transform from among a plurality of transforms. The transform may be selected based on one or more coding characteristics, such as block size, coding mode, or the like. The transform processing unit 52 then applies the selected transform to the TU, producing a video block comprising a two-dimensional array of transform coefficients.

The transform processing unit 52 may send the resulting transform coefficients to the quantization unit 54. The quantization unit 54 may then quantize the transform coefficients. The entropy encoding unit 56 may then perform a scan of the quantized transform coefficients in the matrix according to a scanning mode. This disclosure describes the entropy encoding unit 56 as performing the scan. However, it should be understood that, in other examples, other processing units, such as the quantization unit 54, could perform the scan.

Once the transform coefficients are scanned into the one-dimensional array, the entropy encoding unit 56 may apply entropy coding such as CABAC, syntax-based context-adaptive binary arithmetic coding (SBAC), Probability Interval Partitioning Entropy (PIPE), or another entropy coding methodology to the coefficients. Entropy encoding unit 56 may be configured to code the transform coefficients according to the techniques of this disclosure, including the techniques for coding an abs_level_greater1_group_flag and an abs_level_greater2_group_flag.

To perform CABAC, the entropy encoding unit 56 may select a context model to apply to a certain context to encode symbols to be transmitted. The context may relate to, for example, whether neighboring values are non-zero or not. The entropy encoding unit 56 may also entropy encode syntax elements, such as the signal representative of the selected transform. In accordance with the techniques of this disclosure, the entropy encoding unit 56 may select the context model used to encode these syntax elements based on, for example, an intra-prediction direction for intra-prediction modes, a scan position of the coefficient corresponding to the syntax elements, block type, and/or transform type, among other factors used for context model selection.

Following the entropy coding by the entropy encoding unit 56, the resulting encoded video may be transmitted to another device, such as the video decoder 30, or archived for later transmission or retrieval.

In some cases, the entropy encoding unit 56 or another unit of the video encoder 20 may be configured to perform other coding functions, in addition to entropy coding. For example, the entropy encoding unit 56 may be configured to determine coded block pattern (CBP) values for CU's and PU's. Also, in some cases, the entropy encoding unit 56 may perform run length coding of coefficients.

The inverse quantization unit 58 and the inverse transform processing unit 60 apply inverse quantization and inverse transformation, respectively, to reconstruct the residual block in the pixel domain, e.g., for later use as a reference block. The motion compensation unit 44 may calculate a reference block by adding the residual block to a predictive block of one of the frames of the reference frame buffer 64. The motion compensation unit 44 may also apply one or more interpolation filters to the reconstructed residual block to calculate sub-integer pixel values for use in motion estimation. The summer 62 adds the reconstructed residual block to the motion compensated prediction block produced by the motion compensation unit 44 to produce a reconstructed video block for storage in the reference frame buffer 64. The reconstructed video block may be used by the motion estimation unit 42 and the motion compensation unit 44 as a reference block to inter-code a block in a subsequent video frame.

Figure 6:
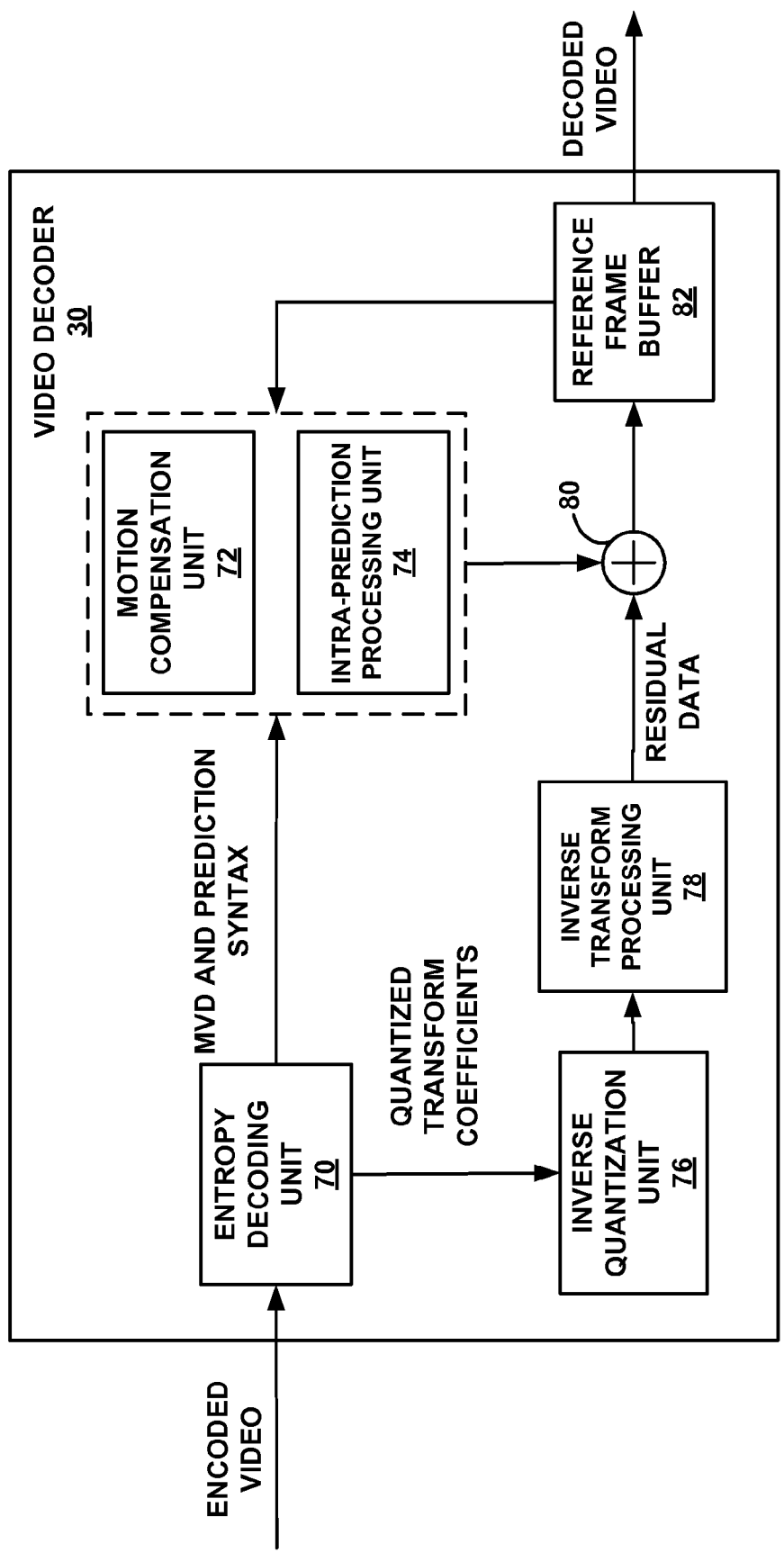
FIG. 6 is a block diagram illustrating an example video decoder.

FIG. 6 is a block diagram illustrating an example of a video decoder 30, which decodes an encoded video sequence. In the example of FIG. 6, the video decoder 30 includes an entropy decoding unit 70, a motion compensation unit 72, an intra-prediction processing unit 74, an inverse quantization unit 76, an inverse transformation unit 78, a reference frame buffer 82 and a summer 80. The video decoder 30 may, in some examples, perform a decoding pass generally reciprocal to the encoding pass described with respect to the video encoder 20 (see FIG. 5).

The entropy decoding unit 70 performs an entropy decoding process on the encoded bitstream to retrieve a one-dimensional array of transform coefficients. The entropy decoding process used depends on the entropy coding used by the video encoder 20 (e.g., CABAC). The entropy coding process used by the encoder may be signaled in the encoded bitstream or may be a predetermined process. Entropy decoding unit 76 may be configured to code the transform coefficients according to the techniques of this disclosure, including the techniques for coding an abs_level_greater1_group_flag and an abs_level_greater2_group_flag.

In some examples, the entropy decoding unit 70 (or the inverse quantization unit 76) may scan the received values using a scan mirroring the scanning mode used by the entropy encoding unit 56 (or the quantization unit 54) of the video encoder 20. Although the scanning of coefficients may be performed in the inverse quantization unit 76, scanning will be described for purposes of illustration as being performed by the entropy decoding unit 70. In addition, although shown as separate functional units for ease of illustration, the structure and functionality of the entropy decoding unit 70, the inverse quantization unit 76, and other units of the video decoder 30 may be highly integrated with one another.

The inverse quantization unit 76 inverse quantizes, i.e., de-quantizes, the quantized transform coefficients provided in the bitstream and decoded by the entropy decoding unit 70. The inverse quantization process may include a conventional process, e.g., similar to the processes proposed for HEVC or defined by the H.264 decoding standard. The inverse quantization process may include use of a quantization parameter QP calculated by the video encoder 20 for the CU to determine a degree of quantization and, likewise, a degree of inverse quantization that should be applied. The inverse quantization unit 76 may inverse quantize the transform coefficients either before or after the coefficients are converted from a one-dimensional array to a two-dimensional array.

The inverse transform processing unit 78 applies an inverse transform to the inverse quantized transform coefficients. In some examples, the inverse transform processing unit 78 may determine an inverse transform based on signaling from the video encoder 20, or by inferring the transform from one or more coding characteristics such as block size, coding mode, or the like. In some examples, the inverse transform processing unit 78 may determine a transform to apply to the current block based on a signaled transform at the root node of a quadtree for an LCU including the current block. Alternatively, the transform may be signaled at the root of a TU quadtree for a leaf-node CU in the LCU quadtree. In some examples, the inverse transform processing unit 78 may apply a cascaded inverse transform, in which inverse transform processing unit 78 applies two or more inverse transforms to the transform coefficients of the current block being decoded.

The intra-prediction processing unit 74 may generate prediction data for a current block of a current frame based on a signaled intra-prediction mode and data from previously decoded blocks of the current frame.

The motion compensation unit 72 may retrieve the motion vector, motion prediction direction and reference index from the encoded bitstream. The reference prediction direction indicates whether the inter-prediction mode is uni-directional (e.g., a P frame) or bi-directional (a B frame). The reference index indicates which reference frame the candidate motion vector is based on.

Based on the retrieved motion prediction direction, reference frame index, and motion vector, the motion compensation unit produces a motion compensated block for the current portion. These motion compensated blocks essentially recreate the predictive block used to produce the residual data.

The motion compensation unit 72 may produce the motion compensated blocks, possibly performing interpolation based on interpolation filters. Identifiers for interpolation filters to be used for motion estimation with sub-pixel precision may be included in the syntax elements. The motion compensation unit 72 may use interpolation filters as used by the video encoder 20 during encoding of the video block to calculate interpolated values for sub-integer pixels of a reference block. The motion compensation unit 72 may determine the interpolation filters used by the video encoder 20 according to received syntax information and use the interpolation filters to produce predictive blocks.

Additionally, the motion compensation unit 72 and the intra-prediction processing unit 74, in an HEVC example, may use some of the syntax information (e.g., provided by a quadtree) to determine sizes of LCUs used to encode frame(s) of the encoded video sequence. The motion compensation unit 72 and the intra-prediction processing unit 74 may also use syntax information to determine split information that describes how each CU of a frame of the encoded video sequence is split (and likewise, how sub-CUs are split). The syntax information may also include modes indicating how each split is encoded (e.g., intra- or inter-prediction, and for intra-prediction an intra-prediction encoding mode), one or more reference frames (and/or reference lists containing identifiers for the reference frames) for each inter-encoded PU, and other information to decode the encoded video sequence.

The summer 80 combines the residual blocks with the corresponding prediction blocks generated by the motion compensation unit 72 or the intra-prediction processing unit 74 to form decoded blocks. If desired, a deblocking filter may also be applied to filter the decoded blocks in order to remove blockiness artifacts. The decoded video blocks are then stored in the reference frame buffer 82 (also referred to as a decoded picture buffer), which provides reference blocks for subsequent motion compensation and also produces decoded video for presentation on a display device (such as the display device 32 of FIG. 1).

Figure 7:
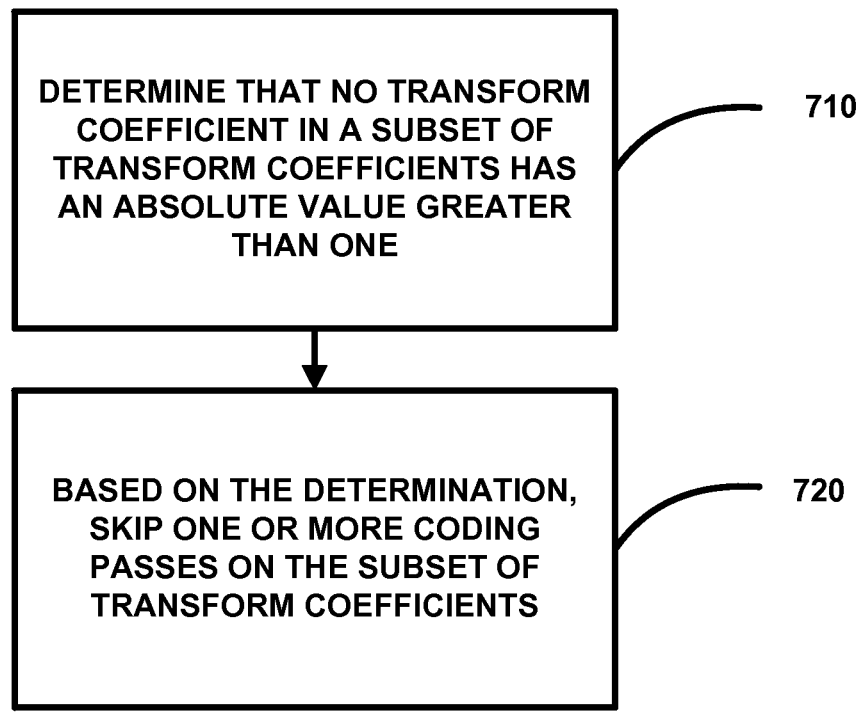
FIG. 7 is a flowchart showing an example video coding method according to the techniques of this disclosure.

FIG. 7 is a flowchart showing an example video coding method according to the techniques of this disclosure. The method of FIG. 7 may be generically carried out by both video encoder 20 and/or video encoder 30. In one example of the disclosure, the method of FIG. 7 may be carried out by one or more hardware units of video encoder 20 and/or video encoder 30, including entropy encoding unit 56 and entropy decoding unit 70.

In one example, entropy encoding unit 56 and/or entropy decoding unit 70 may be configured to code data indicative of a subset of transform coefficients, the coefficients being indicative of residual data for a block of video data. Entropy encoding unit 56 and/or entropy decoding unit 70 may be configured to determine that no transform coefficient in the subset of transform coefficients has an absolute value greater than one (e.g., using an abs_level_greater1_group_flag), and based on the determination, skip one or more coding passes (e.g., gr1Flag, gr2Flag, and levelRem) on the subset of transform coefficients, the coding passes relating to coding level information associated with the subset of transform coefficients. Specific examples of how the techniques of FIG. 7 may be implemented in video encoder 20 and video decoder 30 will be discussed with reference to FIG. 8 and FIG. 9, respectively.

Figure 8:
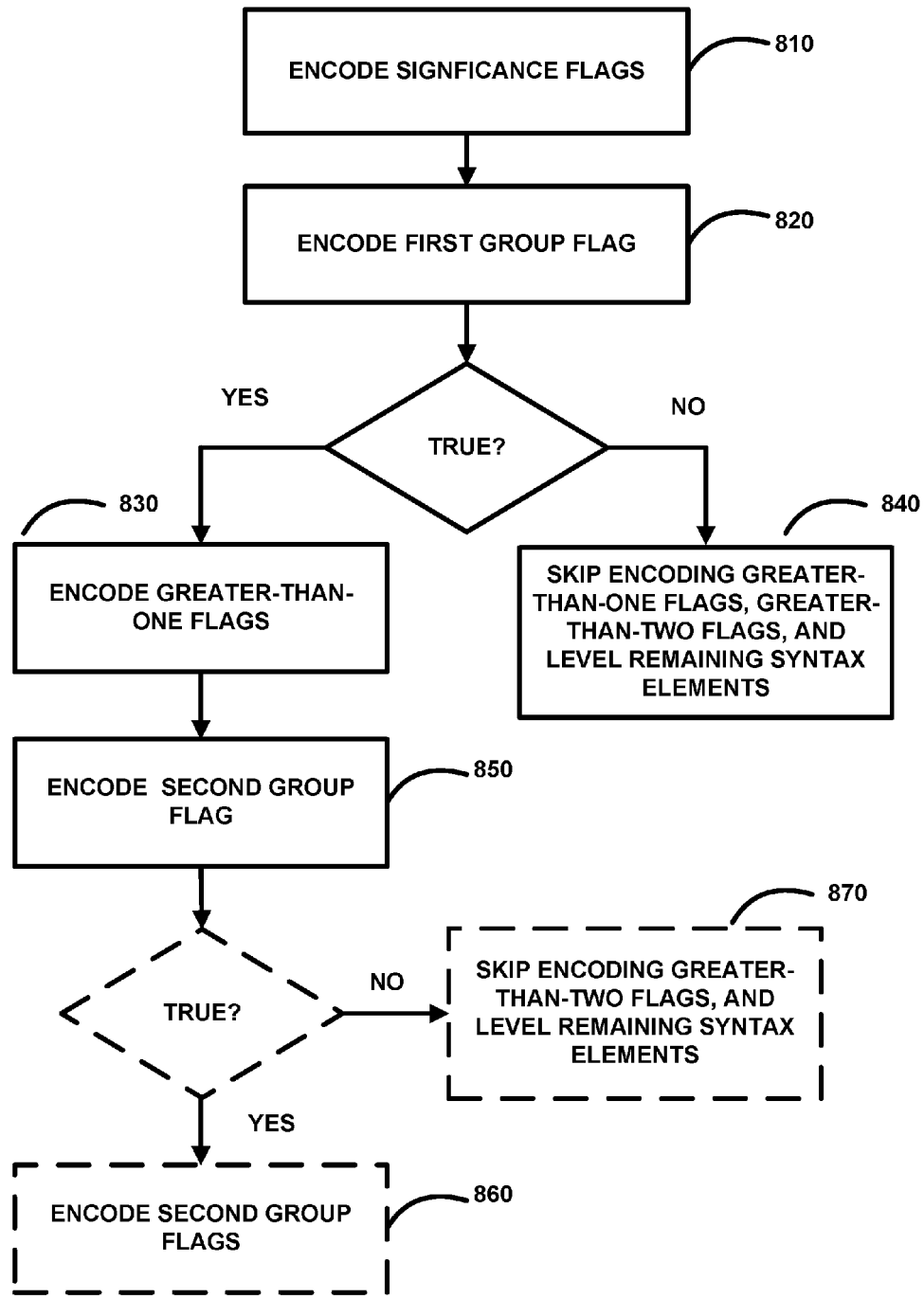
FIG. 8 is a flowchart showing an example video encoding method according to the techniques of this disclosure.

FIG. 8 is a flowchart showing an example video encoding method according to the techniques of this disclosure. The method of FIG. 8 may be carried out by video encoder 20, and more specifically, may be carried out by one or more hardware units of video encoder 20, including entropy encoding unit 56. With reference to FIG. 7, entropy encoding unit 56 may be configured to encode data indicative of a subset of transform coefficients, the coefficients being indicative of residual data for a block of video data. Entropy coding unit 56 may be configured to determine that no transform coefficient in the subset of transform coefficients has an absolute value greater than one, and based on the determination, skip one or more encoding passes on the subset of transform coefficients, the encoding passes relating to encoding level information associated with the subset of transform coefficients.

Referring now to FIG. 8, entropy encoding unit 56 may first be configured to encode significance map flags (810). Entropy encoding unit 56 may be further configured encode a first group flag (e.g., abs_level_greater1_group_flag) which indicates whether or not the subset includes at least one transform coefficient with an absolute value greater than one in the case that one or more significance flags indicate that the subset of transform coefficients includes at least one particular transform coefficient having an absolute value greater than zero (820).

In the case that the first group flag indicates that the subset of transform coefficients includes at least one transform coefficient with an absolute value greater than one (i.e., true), entropy encoding unit 56 may be further configured to encode a greater-than-one flag for the transform coefficients in the subset of transform, wherein the greater-than-one flag indicates whether or not the particular transform coefficient has an absolute value greater than one (830). In the case that the first group flag indicates that subset of transform coefficients does not include at least one transform coefficient with an absolute value greater than one (i.e., not true), entropy encoding unit 56 may be further configured to not encode the greater-than-one flag, the greater-than-two flag, and the level remaining syntax element (840).

Optionally, in the case that entropy encoding unit 56 does encode greater-than-one flags, entropy encoding unit 56 may be further configured to encode a second group flag (e.g., abs_level_greater2_group_flag) indicating whether or not the subset of transform coefficients includes any transform coefficients with an absolute value greater than two (850). In the case that the second group flag indicates that the subset of transform coefficients includes at least one transform coefficient with an absolute value greater than two (i.e., true), entropy encoding unit 56 may be further configured to encode a greater-than-two flag for the transform coefficients in the subset of transform, wherein the greater-than-two flag indicates whether or not the particular transform coefficient has an absolute value greater than two (860). In the case that the second group flag indicates that subset of transform coefficients does not include at least one transform coefficient with an absolute value greater than two (i.e., not true), entropy encoding unit 56 may be further configured to not encode the greater-than-two flag, and the level remaining syntax element (870).

In some examples, entropy encoding unit 56 may be configured to infer (i.e., not encode) a value of the first group flag based on one or more predetermined criteria. In one example, the predetermined criteria include a presence of a DC coefficient in the subset of transform coefficients. In another example, the predetermined criteria include a threshold number of significant coefficients in the subset of transform coefficients.

Figure 9:
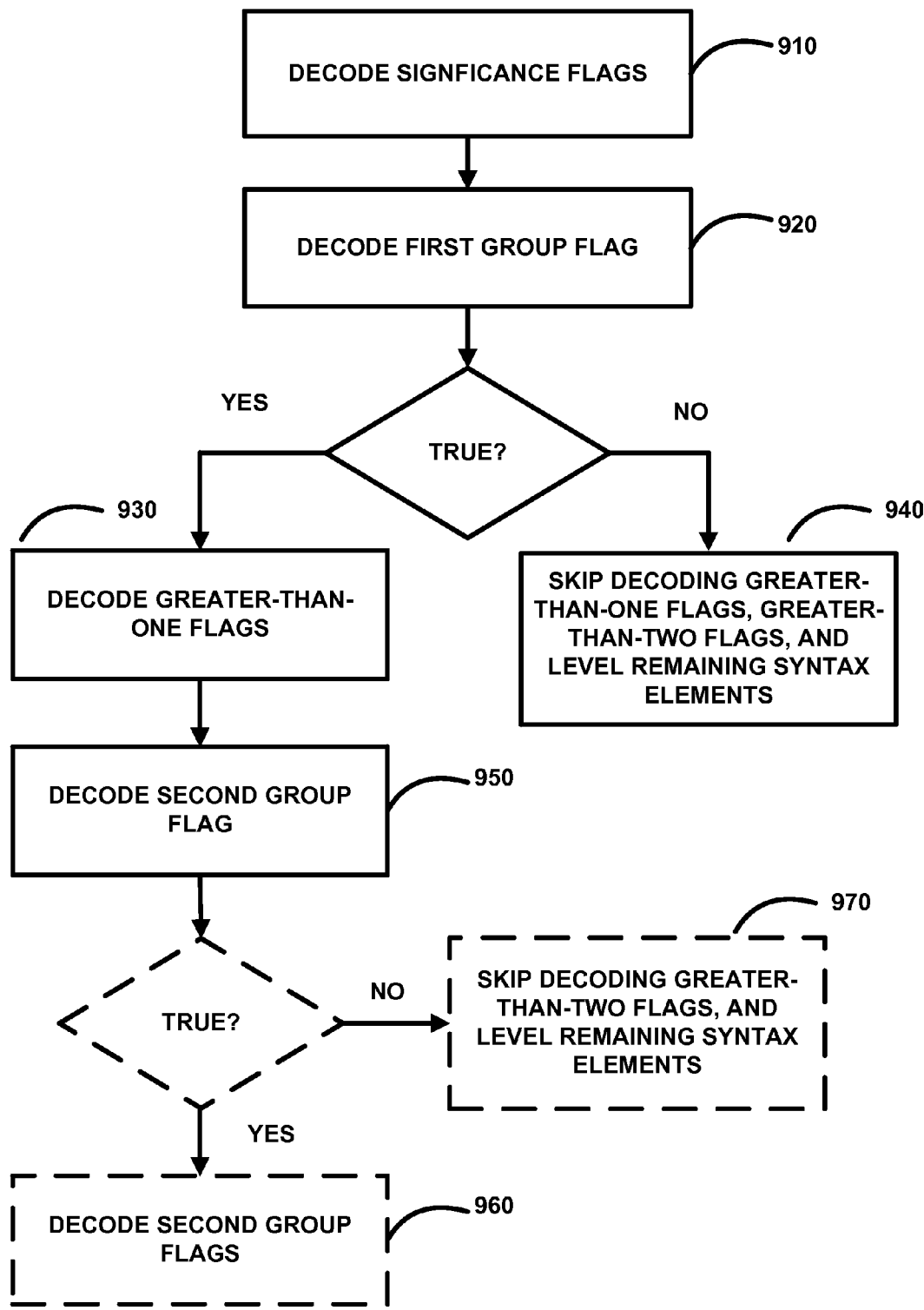
FIG. 9 is a flowchart showing an example video decoding method according to the techniques of this disclosure.

FIG. 9 is a flowchart showing an example video decoding method according to the techniques of this disclosure. The method of FIG. 9 may be carried out by video decoder 30, and more specifically, may be carried out by one or more hardware units of video decoder 30, including entropy decoding unit 70. With reference to FIG. 7, entropy decoding unit 70 may be configured to decode data indicative of a subset of transform coefficients, the coefficients being indicative of residual data for a block of video data. Entropy decoding unit 70 may be configured to determine that no transform coefficient in the subset of transform coefficients has an absolute value greater than one, and based on the determination, skip one or more encoding passes on the subset of transform coefficients, the encoding passes relating to encoding level information associated with the subset of transform coefficients.

Referring now to FIG. 9, entropy decoding unit 706 may first be configured to decode significance map flags (910). Entropy decoding unit 70 may be further configured decode a first group flag (e.g., abs_level_greater1_group_flag) which indicates whether or not the subset includes at least one transform coefficient with an absolute value greater than one in the case that one or more significance flags indicate that the subset of transform coefficients includes at least one particular transform coefficient having an absolute value greater than zero (920).

In the case that the first group flag indicates that the subset of transform coefficients includes at least one transform coefficient with an absolute value greater than one (i.e., true), entropy decoding unit 70 may be further configured to decode a greater-than-one flag for the transform coefficients in the subset of transform, wherein the greater-than-one flag indicates whether or not the particular transform coefficient has an absolute value greater than one (930). In the case that the first group flag indicates that subset of transform coefficients does not include at least one transform coefficient with an absolute value greater than one (i.e., not true), entropy decoding unit 70 may be further configured to not decode the greater-than-one flag, the greater-than-two flag, and the level remaining syntax element (940).

Optionally, in the case that entropy decoding unit 70 does decode greater-than-one flags, entropy decoding unit 70 may be further configured to decode a second group flag (e.g., abs_level_greater2_group_flag) indicating whether or not the subset of transform coefficients includes any transform coefficients with an absolute value greater than two (950). In the case that the second group flag indicates that the subset of transform coefficients includes at least one transform coefficient with an absolute value greater than two (i.e., true), entropy decoding unit 70 may be further configured to decode a greater-than-two flag for the transform coefficients in the subset of transform, wherein the greater-than-two flag indicates whether or not the particular transform coefficient has an absolute value greater than two (960). In the case that the second group flag indicates that subset of transform coefficients does not include at least one transform coefficient with an absolute value greater than two (i.e., not true), entropy decoding unit 70 may be further configured to not decode the greater-than-two flag, and the level remaining syntax element (970).

In some examples, entropy decoding unit 70 may be configured to infer a value of the first group flag based on one or more predetermined criteria. In one example, the predetermined criteria include a presence of a DC coefficient in the subset of transform coefficients. In another example, the predetermined criteria include a threshold number of significant coefficients in the subset of transform coefficients.

In one or more examples, the functions described may be implemented in hardware, software, firmware, or any combination thereof. If implemented in software, the functions may be stored on or transmitted over, as one or more instructions or code, a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transient media, but are instead directed to non-transient, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples have been described. These and other examples are within the scope of the following claims.

What is claimed is:

1. A method of decoding data indicative of a subset of transform coefficients, the coefficients being indicative of residual data for a block of video data, the method comprising:
   decoding one or more significance flags in the subset of transform coefficients;
   determining that no transform coefficient in the subset of transform coefficients has an absolute value greater than one based on a first group flag, wherein the first group flag indicates whether or not the subset includes at least one transform coefficient with an absolute value greater than one in the case that the one or more significance flags indicate that the subset of transform coefficients includes at least one particular transform coefficient having an absolute value greater than zero; and
   based on the determining, skipping one or more decoding passes on the subset of transform coefficients, the decoding passes relating to decoding level information associated with the subset of transform coefficients.

2. The method of claim 1, further comprising:
   decoding a greater-than-one flag for the transform coefficients in the subset of transform coefficients in the case that the first group flag indicates that the subset of transform coefficients includes at least one transform coefficient with an absolute value greater than one, wherein the greater-than-one flag indicates whether or not the particular transform coefficient has an absolute value greater than one,
   wherein skipping one or more decoding passes on the subset of transform coefficients comprises not decoding the greater-than-one flag in the case that the first group flag indicates that the subset of transform coefficients does not include at least one transform coefficient with an absolute value greater than one.

3. The method of claim 2, wherein skipping one or more decoding passes on the subset of transform coefficients further comprises not decoding a greater-than-two-flag and a level remaining syntax element in the case that the first group flag indicates that the subset of transform coefficients does not include at least one transform coefficient with an absolute value greater than one.

4. The method of claim 1, further comprising:
   decoding a second group flag indicating whether or not the subset of transform coefficients includes any transform coefficients with an absolute value greater than two in the case that one or more greater-than-one flags or the first group flag indicates at least one transform coefficient has an absolute value greater than one; and
   decoding a greater-than-two flag for the transform coefficients in the subset of transform coefficients indicated as having an absolute value larger than one in the case that the second group flag indicates that the subset of transform coefficients includes transform coefficients with an absolute value greater than two, wherein the greater-than-two flag indicates whether or not the particular transform coefficient has an absolute value greater than two, and
   wherein skipping one or more decoding passes on the subset of transform coefficients comprises not decoding the greater-than-two flag in the case that the second group flag indicates that the subset of transform coefficients does not include transform coefficients with an absolute value greater than two.

5. The method of claim 4, wherein skipping one or more decoding passes on the subset of transform coefficients further comprises not decoding a level remaining syntax element in the case that the second group flag indicates that the subset of transform coefficients does not include transform coefficients with an absolute value greater than two.

6. The method of claim 1, wherein decoding the first group flag comprises:
inferring a value of the first group flag based on one or more predetermined criteria.

7. The method of claim 6, wherein the predetermined criteria includes a presence of a DC coefficient in the subset of transform coefficients.

8. The method of claim 6, wherein the predetermined criteria includes a threshold number of significant coefficients in the subset of transform coefficients.

9. A method of encoding data indicative of a subset of transform coefficients, the coefficients being indicative of residual data for a block of video data, the method comprising:
encoding one or more significance flags in the subset of transform coefficients;
determining that no transform coefficient in the subset of transform coefficients has an absolute value greater than one;
encoding a first group flag indicating whether or not the subset includes at least one transform coefficient with an absolute value greater than one in the case that the one or more significance flags indicate that the subset of transform coefficients includes at least one particular transform coefficient having an absolute value greater than zero; and
based on the determining, skipping one or more encoding passes on the subset of transform coefficients, the encoding passes relating to encoding level information associated with the subset of transform coefficients.

10. The method of claim 9, further comprising:
encoding a greater-than-one flag for the transform coefficients in the subset of transform coefficients in the case that the first group flag indicates that the subset of transform coefficients includes at least one transform coefficient with an absolute value greater than one, wherein the greater-than-one flag indicates whether or not the particular transform coefficient has an absolute value greater than one,
wherein skipping one or more encoding passes on the subset of transform coefficients comprises not encoding the greater-than-one flag in the case that the first group flag indicates that the subset of transform coefficients does not include at least one transform coefficient with an absolute value greater than one.

11. The method of claim 10, wherein skipping one or more encoding passes on the subset of transform coefficients further comprises not encoding a greater-than-two-flag and a level remaining syntax element in the case that the first group flag indicates that the subset of transform coefficients does not include at least one transform coefficient with an absolute value greater than one.

12. The method of claim 9, further comprising:
encoding a second group flag indicating whether or not the subset of transform coefficients includes any transform coefficients with an absolute value greater than two in the case that one or more greater-than-one flags or the first group flag indicates at least one transform coefficient has an absolute value greater than one; and
encoding a greater-than-two flag for the transform coefficients in the subset of transform coefficients indicated as having an absolute value larger than one in the case that the second group flag indicates that the subset of transform coefficients includes transform coefficients with an absolute value greater than two, wherein the greater-than-two flag indicates whether or not the particular transform coefficient has an absolute value greater than two, and
wherein skipping one or more encoding passes on the subset of transform coefficients comprises not encoding the greater-than-two flag in the case that the second group flag indicates that the subset of transform coefficients does not include transform coefficients with an absolute value greater than two.

13. The method of claim 12, wherein skipping one or more encoding passes on the subset of transform coefficients further comprises not encoding a level remaining syntax element in the case that the second group flag indicates that the subset of transform coefficients does not include transform coefficients with an absolute value greater than two.

14. The method of claim 9, wherein encoding the first group flag comprises:
inferring a value of the first group flag based on one or more predetermined criteria.

15. The method of claim 14, wherein the predetermined criteria includes a presence of a DC coefficient in the subset of transform coefficients.

16. The method of claim 14, wherein the predetermined criteria includes a threshold number of significant coefficients in the subset of transform coefficients.

17. An apparatus configured to decode data indicative of a subset of transform coefficients, the coefficients being indicative of residual data for a block of video data, the apparatus comprising:
a memory configured to store the subset of transform coefficients; and
a video decoder configured to:
decode one or more significance flags in the subset of transform coefficients;
determine that no transform coefficient in the subset of transform coefficients has an absolute value greater than one based on a first group flag, wherein the first group flag indicates whether or not the subset includes at least one transform coefficient with an absolute value greater than one in the case that the one or more significance flags indicate that the subset of transform coefficients includes at least one particular transform coefficient having an absolute value greater than zero; and
based on the determination, skip one or more decoding passes on the subset of transform coefficients, the decoding passes relating to decoding level information associated with the subset of transform coefficients.

18. The apparatus of claim 17, wherein the video decoder is further configured to:
decode a greater-than-one flag for the transform coefficients in the subset of transform coefficients in the case that the first group flag indicates that the subset of transform coefficients includes at least one transform coefficient with an absolute value greater than one, wherein the greater-than-one flag indicates whether or not the particular transform coefficient has an absolute value greater than one,
wherein skipping one or more decoding passes on the subset of transform coefficients comprises not decoding the greater-than-one flag in the case that the first group flag indicates that the subset of transform coefficients does not include at least one transform coefficient with an absolute value greater than one.

19. The apparatus of claim 18, wherein skipping one or more decoding passes on the subset of transform coefficients further comprises not decoding a greater-than-two-flag and a level remaining syntax element in the case that the first group flag indicates that the subset of transform coefficients does not include at least one transform coefficient with an absolute value greater than one.

20. The apparatus of claim 17, wherein the video decoder is further configured to:
decode a second group flag indicating whether or not the subset of transform coefficients includes any transform coefficients with an absolute value greater than two in the case that one or more greater-than-one flags or the first group flag indicates at least one transform coefficient has an absolute value greater than one; and
decode a greater-than-two flag for the transform coefficients in the subset of transform coefficients indicated as having an absolute value larger than one in the case that the second group flag indicates that the subset of transform coefficients includes transform coefficients with an absolute value greater than two, wherein the greater-than two flag indicates whether or not the particular transform coefficient has an absolute value greater than two, and
wherein skipping one or more decoding passes on the subset of transform coefficients comprises not decoding the greater-than-two flag in the case that the second group flag indicates that the subset of transform coefficients does not include transform coefficients with an absolute value greater than two.

21. The apparatus of claim 20, wherein skipping one or more decoding passes on the subset of transform coefficients further comprises not decoding a level remaining syntax element in the case that the second group flag indicates that the subset of transform coefficients does not include transform coefficients with an absolute value greater than two.

22. The apparatus of claim 17, wherein the video decoder is further configured to:
infer a value of the first group flag based on one or more predetermined criteria.

23. The apparatus of claim 22, wherein the predetermined criteria includes a presence of a DC coefficient in the subset of transform coefficients.

24. The apparatus of claim 22, wherein the predetermined criteria includes a threshold number of significant coefficients in the subset of transform coefficients.

25. The apparatus of claim 17, wherein the video decoder is further configured to:
decode the transform coefficients to form the residual data.

26. An apparatus configured to code data indicative of a subset of transform coefficients, the coefficients being indicative of residual data for a block of video data, the apparatus comprising:
means for coding one or more significance flags in the subset of transform coefficients;
means for determining that no transform coefficient in the subset of transform coefficients has an absolute value greater than one based on a first group flag, wherein the first group flag indicates whether or not the subset includes at least one transform coefficient with an absolute value greater than one in the case that the one or more significance flags indicate that the subset of transform coefficients includes at least one particular transform coefficient having an absolute value greater than zero; and
means for based on the determining, skipping one or more coding passes on the subset of transform coefficients, the coding passes relating to coding level information associated with the subset of transform coefficients.

27. The apparatus of claim 26, further comprising:
means for coding a greater-than-one flag for the transform coefficients in the subset of transform coefficients in the case that the first group flag indicates that the subset of transform coefficients includes at least one transform coefficient with an absolute value greater than one, wherein the greater-than-one flag indicates whether or not the particular transform coefficient has an absolute value greater than one,
wherein the means for skipping one or more coding passes on the subset of transform coefficients comprises means for not coding the greater-than-one flag in the case that the first group flag indicates that the subset of transform coefficients does not include at least one transform coefficient with an absolute value greater than one.

28. The apparatus of claim 27, wherein the means for skipping one or more coding passes on the subset of transform coefficients further comprises means for not coding a greater-than-two-flag and a level remaining syntax element in the case that the first group flag indicates that the subset of transform coefficients does not include at least one transform coefficient with an absolute value greater than one.

29. The apparatus of claim 26, further comprising:
means for coding a second group flag indicating whether or not the subset of transform coefficients includes any transform coefficients with an absolute value greater than two in the case that one or more greater-than-one flags or the first group flag indicates at least one transform coefficient has an absolute value greater than one; and
means for coding a greater-than-two flag for the transform coefficients in the subset of transform coefficients indicated as having an absolute value larger than one in the case that the second group flag indicates that the subset of transform coefficients includes transform coefficients with an absolute value greater than two, wherein the greater-than-two flag indicates whether or not the particular transform coefficient has an absolute value greater than two, and
wherein the means for skipping one or more coding passes on the subset of transform coefficients comprises means for not coding the greater-than-two flag in the case that the second group flag indicates that the subset of transform coefficients does not include transform coefficients with an absolute value greater than two.

30. The apparatus of claim 29, wherein the means for skipping one or more coding passes on the subset of transform coefficients further comprises means for not coding a level remaining syntax element in the case that the second group flag indicates that the subset of transform coefficients does not include transform coefficients with an absolute value greater than two.

31. The apparatus of claim 26, wherein the means for coding the first group flag comprises:
means for inferring a value of the first group flag based on one or more predetermined criteria.

32. The apparatus of claim 31, wherein the predetermined criteria includes a presence of a DC coefficient in the subset of transform coefficients.

33. The apparatus of claim 31, wherein the predetermined criteria includes a threshold number of significant coefficients in the subset of transform coefficients.

34. A non-transitory computer-readable storage medium storing instructions that, when executed, cause one or more processors of a device configured to code data indicative of a subset of transform coefficients, the coefficients being indicative of residual data for a block of video data, to:
- code one or more significance flags in the subset of transform coefficients;
- determine that no transform coefficient in the subset of transform coefficients has an absolute value greater than one based on a first group flag, wherein the first group flag indicates whether or not the subset includes at least one transform coefficient with an absolute value greater than one in the case that the one or more significance flags indicate that the subset of transform coefficients includes at least one particular transform coefficient having an absolute value greater than zero; and
- based on the determination, skip one or more coding passes on the subset of transform coefficients, the coding passes relating to coding level information associated with the subset of transform coefficients.

35. The non-transitory computer-readable storage medium of claim 34, wherein the instructions further cause the one or more processors to:
- code a greater-than-one flag for the transform coefficients in the subset of transform coefficients in the case that the first group flag indicates that the subset of transform coefficients includes at least one transform coefficient with an absolute value greater than one, wherein the greater-than-one flag indicates whether or not the particular transform coefficient has an absolute value greater than one,
- wherein skipping one or more coding passes on the subset of transform coefficients comprises not coding the greater-than-one flag in the case that the first group flag indicates that the subset of transform coefficients does not include at least one transform coefficient with an absolute value greater than one.

36. The non-transitory computer-readable storage medium of claim 35, wherein skipping one or more coding passes on the subset of transform coefficients further comprises not coding a greater-than-two-flag and a level remaining syntax element in the case that the first group flag indicates that the subset of transform coefficients does not include at least one transform coefficient with an absolute value greater than one.

37. The non-transitory computer-readable storage medium of claim 34, wherein the instructions further cause the one or more processors to:
- code a second group flag indicating whether or not the subset of transform coefficients includes any transform coefficients with an absolute value greater than two in the case that one or more greater-than-one flags or the first group flag indicates at least one transform coefficient has an absolute value greater than one; and
- code a greater-than-two flag for the transform coefficients in the subset of transform coefficients indicated as having an absolute value larger than one in the case that the second group flag indicates that the subset of transform coefficients includes transform coefficients with an absolute value greater than two, wherein the greater-than-two flag indicates whether or not the particular transform coefficient has an absolute value greater than two, and
- wherein skipping one or more coding passes on the subset of transform coefficients comprises not coding the greater-than-two flag in the case that the second group flag indicates that the subset of transform coefficients does not include transform coefficients with an absolute value greater than two.

38. The non-transitory computer-readable storage medium of claim 37, wherein skipping one or more coding passes on the subset of transform coefficients further comprises not coding a level remaining syntax element in the case that the second group flag indicates that the subset of transform coefficients does not include transform coefficients with an absolute value greater than two.

39. The non-transitory computer-readable storage medium of claim 34, wherein the instructions further cause the one or more processors to:
- infer a value of the first group flag based on one or more predetermined criteria.

40. The non-transitory computer-readable storage medium of claim 39, wherein the predetermined criteria includes a presence of a DC coefficient in the subset of transform coefficients.

41. The non-transitory computer-readable storage medium of claim 39, wherein the predetermined criteria includes a threshold number of significant coefficients in the subset of transform coefficients.

* * * * *